United States Patent
Stewart et al.

(10) Patent No.: US 10,503,472 B2
(45) Date of Patent: Dec. 10, 2019

(54) APPARATUS AND METHOD FOR PROCESSING FLOATING POINT VALUES

(71) Applicant: ARM LIMITED, Cambridge (GB)

(72) Inventors: Daryl John Stewart, Cambridge (GB); Thomas Christopher Grocutt, Cambridge (GB)

(73) Assignee: ARM Limited, Cambridge (GB)

(*) Notice: Subject to any disclaimer, the term of this patent is extended or adjusted under 35 U.S.C. 154(b) by 80 days.

(21) Appl. No.: 15/735,721

(22) PCT Filed: May 17, 2016

(86) PCT No.: PCT/GB2016/051421
§ 371 (c)(1),
(2) Date: Dec. 12, 2017

(87) PCT Pub. No.: WO2016/207595
PCT Pub. Date: Dec. 29, 2016

(65) Prior Publication Data
US 2018/0173497 A1 Jun. 21, 2018

(30) Foreign Application Priority Data
Jun. 24, 2015 (GB) .................................. 1511131.3

(51) Int. Cl.
*G06F 7/485* (2006.01)
*G06F 7/499* (2006.01)
(Continued)

(52) U.S. Cl.
CPC .............. *G06F 7/485* (2013.01); *G06F 5/012* (2013.01); *G06F 7/4991* (2013.01);
(Continued)

(58) Field of Classification Search
USPC .................................................. 708/495–514
See application file for complete search history.

(56) References Cited

U.S. PATENT DOCUMENTS 6,779,013 B2 * 8/2004 Pangal .................... G06F 7/483
708/503
2002/0178198 A1 11/2002 Steele, Jr.
(Continued)

FOREIGN PATENT DOCUMENTS

EP 1 837 754 9/2007

OTHER PUBLICATIONS

International Search Report and Written Opinion of the ISA for PCT/GB2016/051421, dated Oct. 10, 2016, 22 pages.
(Continued)

*Primary Examiner* — Tan V Mai
(74) *Attorney, Agent, or Firm* — Nixon & Vanderhye P.C.

(57) ABSTRACT

An apparatus and method are provided for processing floating point values using an intermediate representation which has significand, exponent and shadow sections. A less significant portion of the exponent of the floating point value defines a range of positions within the significand section where the representation of the significand is to be held. The exponent section holds a representation of a more significant portion of the exponent indicating a selected window of multiple contiguous windows spanning a value range of a format of the floating point value. A first portion of the significand section corresponds to the selected window and a second portion corresponds to an overlap into a further window which is adjacent to and lower in the value range. The shadow section holds values for populating the second portion of the significand section when the representation of the significand of the floating point value is moved to a higher window which is adjacent to and higher in the value range than the selected window. The shadow section allows the selected window to be shifted, such that the summation of multiple values produces the same result independent of the order in which the values are summed.

20 Claims, 13 Drawing Sheets

(51) Int. Cl.
*G06F 5/01* (2006.01)
*G06F 7/544* (2006.01)
(52) U.S. Cl.
CPC ...... *G06F 7/49905* (2013.01); *G06F 7/49942* (2013.01); *G06F 7/5443* (2013.01)

(56) References Cited

U.S. PATENT DOCUMENTS

| | | | |
|---|---|---|---|
| 2002/0184285 A1* | 12/2002 | Pangal | G06F 7/485 708/505 |
| 2002/0194239 A1 | 12/2002 | Pangal | |
| 2003/0028572 A1 | 2/2003 | Hoskote et al. | |
| 2011/0219207 A1* | 9/2011 | Suh | G06F 15/76 712/7 |
| 2015/0095393 A1 | 4/2015 | Moyer | |

OTHER PUBLICATIONS

Combined Search and Examination Report for GB1511131.3, dated Dec. 24, 2015, 8 pages.

* cited by examiner i) SWACCGEN (FP, DESTINATION)
ii) SWACCSUM (SWACC1, SWACC2, [DESTINATION])
iii) SWACCSUM1 (FP, SWACC, [DESTINATION])
iv) SWACCSUM2 (SSWACC, SSWACC, [DESTINATION])
v) SWACCSUM3 (FP, SSWACC, [DESTINATION])
vi) SWACCSUM4 (SSWACC, SWACC, SIGN, [DESTINATION]

APPARATUS AND METHOD FOR PROCESSING FLOATING POINT VALUES

TECHNICAL FIELD

The present disclosure relates to data processing. More particularly it relates to handling floating point values when performing data processing.

BACKGROUND

A data processing apparatus may be capable of receiving values in a floating point format and be capable of generating a sum of floating point input values, for example as an accumulation operation. However, an issue which arises with respect to performing such floating point addition is that it is generally not associative. In other words, the result of summing three or more floating point values depends on the order in which the additions are performed. Small values added to large values may have no effect, so programmers may choose to sum small values first. Similarly the result of summing positive and negative floating point values depends on the order of summation. If large values are expected to cancel, small values may be summed last. Floating point numbers have an encoding which on the one hand is beneficial because it enables a very large range of values to be represented, but on the other hand makes it almost inevitable that there will be a loss of accuracy when multiple floating point values are summed and that this loss will be different depending on the order in which the values are summed. Such non-deterministic outcomes for calculations are typically rather undesirable in the context of data processing, yet inspection and sorting the input values before summation also adds complexity to the data processing apparatus carrying out such summation and moreover slows down the process. Alternatively, to limit the precision of the final sum, such that any variation due to the summation order is hidden below the precision of the output sum to achieve a deterministic final sum is also undesirable in the context of high precision floating point numbers.

SUMMARY

In one example embodiment there is an apparatus comprising circuitry for processing an intermediate representation of a floating point value, wherein the intermediate representation comprises a significand section to hold a representation of a significand of the floating point value, wherein a less significant portion of an exponent of the floating point value defines a range of positions within the significand section where the representation of the significand is to be held; an exponent section to hold a representation of a more significant portion of the exponent of the floating point value which indicates a selected window of multiple contiguous windows spanning a value range of a format of the floating point value, wherein a first portion of the significand section corresponds to the selected window and wherein a second portion of the significand section corresponds to an overlap into a further window which is adjacent to and lower in the value range than the selected window; and a shadow section to hold values for populating the second portion of the significand section when the representation of the significand of the floating point value is moved to a higher window which is adjacent to and higher in the value range than the selected window.

In another example embodiment there is a computer program product on which is stored in a non-transient fashion a computer program which when executed on a computing device causes the computing device to operate as the apparatus of the above example.

In another example embodiment there is software which when executed on a computing device causes the computing device to operate as the apparatus of the above example.

In another example embodiment there is a method of storing an intermediate representation of a floating point value, the method comprising storing a representation of a significand of the floating point value in a significand section of the intermediate representation, wherein a less significant portion of an exponent of the floating point value defines a range of positions within the significand section where the representation of the significand is to be stored; storing a representation of a more significant portion of the exponent of the floating point value in an exponent section of the intermediate representation, which indicates a selected window of multiple contiguous windows spanning a value range of a format of the floating point value, wherein a first portion of the significand section corresponds to the selected window and wherein a second portion of the significand section corresponds to an overlap into a further window which is adjacent to and lower in the value range than the selected window; and storing values for populating the second portion of the significand section when the representation of the significand of the floating point value is moved to a higher window which is adjacent to and higher in the value range than the selected window.

In another example embodiment there is a computer product on which is stored in a non-transient fashion a computer program which when executed on a computing device causes the computing device to carry out the method of the above example.

In another example embodiment there is software which when executed on a computing device causes the computing device to carry out the method of the above example.

In another example embodiment there is an apparatus comprising means for storing a intermediate representation of a floating point value, the means comprising: means for storing a representation of a significand of the floating point value in a significand section of the intermediate representation, wherein a less significant portion of an exponent of the floating point value defines a range of positions within the significand section where the representation of the significand is to be stored;

means for storing a representation of a more significant portion of the exponent of the floating point value in an exponent section of the intermediate representation, which indicates a selected window of multiple contiguous windows spanning a value range of a format of the floating point value, wherein a first portion of the significand section corresponds to the selected window and wherein a second portion of the significand section corresponds to an overlap into a further window which is adjacent to and lower in the value range than the selected window; and means for storing values for populating the second portion of the significand section when the representation of the significand of the floating point value is moved to a higher window which is adjacent to and higher in the value range than the selected window.

BRIEF DESCRIPTION OF THE DRAWINGS

The present techniques will be described further, by way of example only, with reference to embodiments thereof as illustrated in the accompanying drawings, in which.

DESCRIPTION OF EMBODIMENTS

Figure 1:
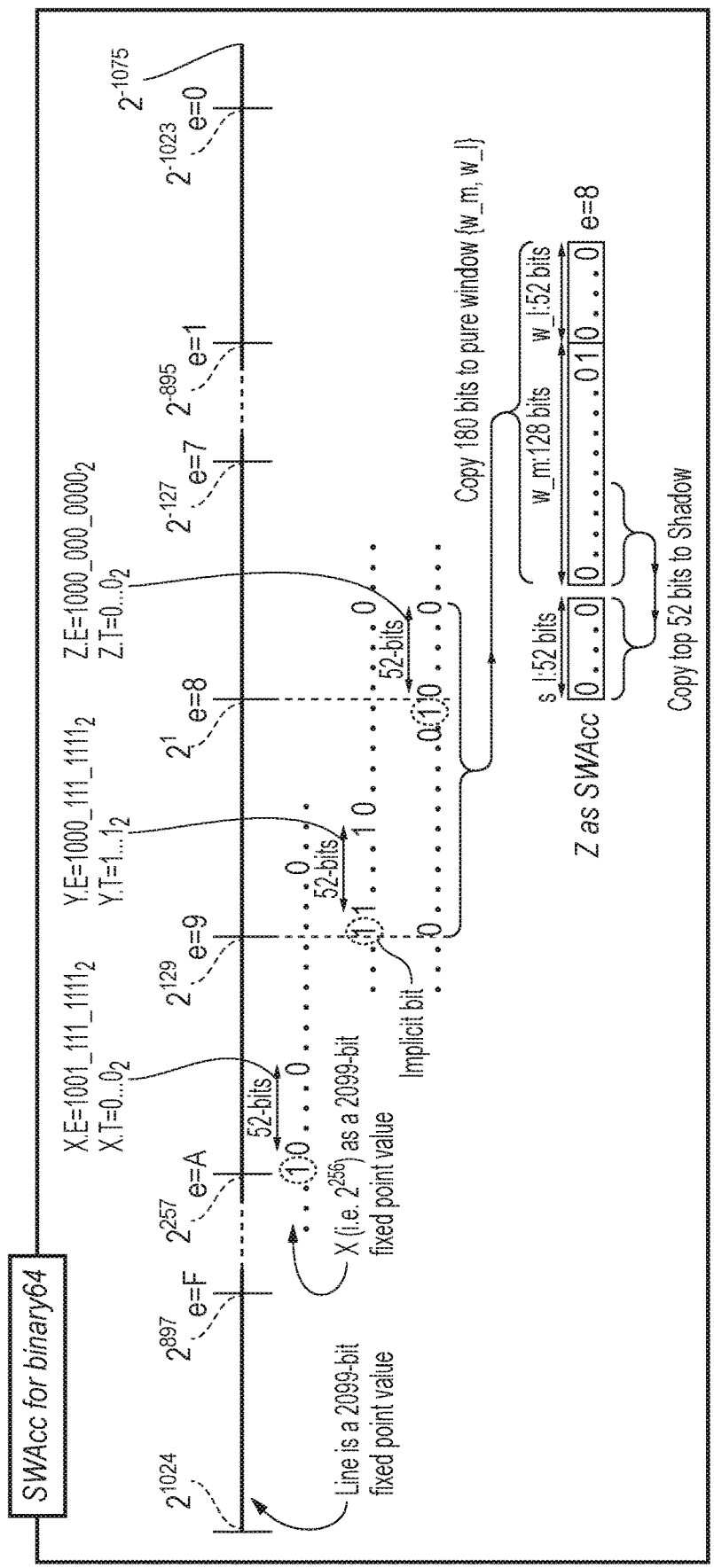
FIG. 1 illustrates the value range of a double precision binary 64-bit floating point format and three example floating point values which lie within that range, with one example of the preparation of the intermediate representation of the present techniques in one embodiment.

At least some embodiments provide an apparatus comprising circuitry for processing an intermediate representation of a floating point value, wherein the intermediate representation comprises: a significand section to hold a representation of a significand of the floating point value, wherein a less significant portion of an exponent of the floating point value defines a range of positions within the significand section where the representation of the significand is to be held; an exponent section to hold a representation of a more significant portion of the exponent of the floating point value which indicates a selected window of multiple contiguous windows spanning a value range of a format of the floating point value, wherein a first portion of the significand section corresponds to the selected window and wherein a second portion of the significand section corresponds to an overlap into a further window which is adjacent to and lower in the value range than the selected window; and a shadow section to hold values for populating the second portion of the significand section when the representation of the significand of the floating point value is moved to a higher window which is adjacent to and higher in the value range than the selected window.

The present techniques provide an intermediate representation (also referred to herein as a Sliding Window Accumulator (SWAcc)) of a floating point value which may be viewed as a variety of fixed point representation of an unsigned floating point values within a given exponent range. This intermediate representation has three core portions, namely a significand section, an exponent section and a shadow section. Part of the value of the exponent of the floating point value (a less significant portion) determines where the significand of the floating point value is to be held within the intermediate representation, in particular within in the significand section. Moreover, the exponent section of the intermediate representation holds a representation of a more significant portion of the exponent of the floating point value. The present techniques subdivide the value range associated with a particular format of the floating point value (for example from $2^{-1023}$ to $2^{1024}$ for a double precision 64-bit floating point number, as specified by the IEEE 754 standard) into multiple contiguous "windows" and the more significant portion of the exponent of the floating point value indicates a particular window of these multiple windows within which the significand of the floating point value lies. The less significant portion of the exponent of the floating point value then defines where within that selected window the significand of the floating point value lies.

The shadow section provided by the present techniques in the intermediate representation allows a copy to be held of a more significant portion of the significand of the floating point value as represented within the selected window, which the inventors of the present techniques have found to be a useful mechanism for dealing with the movement of floating point values between windows of the multiple contiguous windows, for example when summation of multiple floating point values in this intermediate representation is carried out. In fact, the present techniques provide that the intermediate representation allows the significand of the floating point value to extend beyond the selected window into a further window which is adjacent to and lower in the value range than the selected window for that significand. Notably, the size of the shadow section provided corresponds to the size of this overlap into the lower, adjacent window. This means that if a window shift for a floating point value in the intermediate representation is required, for example because it needs to be aligned with another floating point value in the intermediate representation (as will be discussed in more detail below), or due to the fact that summation of two floating point values in the intermediate representation has resulted in a sum value in the intermediate representation which is more appropriately represented in the next higher window, the value held in the shadow section enables an accurate determination to be made of the appropriate representation in that next higher window. This is because a correct value for the region of the next higher window which overlaps into the old current window is required and notably a summation value held thus far in the current window may include some values which would not have affected the total in the new higher window. In other words, the shadow section holds the value that this overlap section would have had if the window shift had occurred earlier and thus the correct sum represented in the new higher window can be determined.

In some embodiments the apparatus further comprises summation circuitry to perform a summation operation on two operands in the intermediate representation, wherein the summation operation comprises comparing a first exponent value and a second exponent value respectively from the exponent sections of the two operands and, when the first exponent value and the second exponent value differ by one, performing a window shift operation on a smaller operand of the two operands to adjust the selected window of the smaller operand to match the selected window of a larger operand of the two operands; and summing the significand sections and the shadow sections respectively of the two operands to generate a sum value in the intermediate representation.

In order to be able to sum two operands which are in the intermediate representation the apparatus may be provided with summation circuitry. It should be noted that the two operands in the intermediate representation which the summation circuitry uses for the summation operation may come from a variety of sources. For example, both operands may be specified in a summation instruction executed by the apparatus, at least one of them may be given as an immediate value in such an instruction, and indeed one or both of them may be provided or specified in their original floating point format by the instruction and the apparatus may then convert one or both of the floating point values as appropriate into the two operands in the intermediate representation before performing the summation operation. The manner in which the summation operation is carried out comprises comparing the exponent values given by the exponent sections (in the intermediate representation) of the two operands. The particular characteristic to be identified is when one exponent value differs from the other by one, meaning that the operands lie in adjacent windows, and in this situation a window shift operation on the smaller operand is carried out to align the selected windows of the two operands (to that already identified for the larger operand). This enables an appropriate summation operation to be carried out to generate a sum value in the intermediate representation.

In some embodiments the apparatus may further comprise storage circuitry to store one or more intermediate representations. When the summation circuitry performs the summation operation at least one of the two operands may be already stored (and then retrieved from) storage circuitry. In some embodiments one or both of the two operands may be provided as an immediate summand for the summation operation, for example provided by an instruction which configures the summation circuitry to perform the summation operation.

The destination of the sum of the summation operation may take a variety of forms, but in some embodiments the summation operation is an accumulation operation with respect to the one of the two operands stored in the storage circuitry.

In order to support the window shift operation which may be required to be carried out as part of the summation operation, in some embodiments the apparatus comprises copying circuitry to copy the shadow section of the smaller operand to the second portion of the significand section of the smaller operand; clearing circuitry to clear the shadow section of the smaller operand and to clear the first portion of the significand section of the smaller operand; and increment circuitry to increment the exponent value of the smaller operand by one. Accordingly, the copying circuitry enables the shadow section of the smaller operand to then be made use of as newly positioned in the significand section to take account of the shift to the next higher window, and the clearing circuitry then "resets" the relevant portions of the smaller operand (shadow section) and first portion of the significand section (which held the relevant part of the significand section when represented in the lower window). Finally, increment circuitry is provided to adjust the exponent value of the smaller operand to shift it to the next higher window. As a result, both the smaller operand and the larger operand are then directly represented in the same window, ready for their summation to be carried out.

It may be the case that the summing of the shadow sections of the two operands carried out as part of the summation operation results in an overflow and in some embodiments the summation circuitry has circuitry, responsive to the summing of the shadow sections of the two operands resulting in a shadow overflow, to perform the window shift operation on the sum value to adjust the selected window of the two operands to give the selected window of the sum value. Thus, in this situation, this circuitry enables the selected window of the two operands (i.e. which originally matched, or as described above to which the smaller operand has just been adjusted) to be adjusted to give an appropriate window (i.e. typically one higher) for the sum value.

When such a shadow overflow occurs, it may be the case that the shadow overflow can immediately be used and does not need to be held in any manner, but in some embodiments the apparatus comprises shadow overflow storage, and circuitry responsive to the summing of the shadow sections of the two operands resulting in the shadow overflow, to store the shadow overflow in the shadow overflow storage. In some embodiments, in order to handle the situation in which such a shadow overflow takes place, the copying circuitry has circuitry to copy the shadow overflow to a least significant portion of the first portion of the significand section of the smaller operand.

It may also be the case that summation of the significand sections of the two operands may result in a significand overflow and in some embodiments the summation circuitry has circuitry, responsive to the summing of the significand sections of the two operands resulting in a significand overflow, to perform the window shift operation on the sum value to adjust the selected window of the two operands to give a selected window of the sum value. Thus, when such a significand overflow does occur, this circuitry of the summation circuitry enables a window shift operation to be carried out on the sum value to move its representation from one window to a higher window in order to more usefully present the sum value in the intermediate representation.

In some embodiments the copying circuitry has circuitry to copy the significand overflow to a least significant portion of the first portion of the significand section of the smaller operand. The value of the significand overflow generated as a result of the summation is then appropriately captured for further processing.

In situations in which such a significand overflow takes place, it may be the case that the significand overflow value can immediately be used and does not need to be temporarily held in any way, but in some embodiments the apparatus further comprises significand overflow storage and circuitry, responsive to the summing of the significand sections of the two operands resulting in the significand overflow, to store the significand overflow in the significand overflow storage. This significand overflow value can then be held prior to being used in a later stage of processing the intermediate representation.

When the comparison of the exponent values of the two operands carried out as part of summation operation reveals that they differ by more than one, the shadow section of the smaller operand cannot be made use of to re-represent the smaller operand in the window of the larger operand, and indeed the smaller operand is then in any regard identified as being significantly smaller than the larger operand and hence will not affect the final sum value generated from a summation of these two operands. Accordingly in some embodiments the summation circuitry is responsive to the first exponent value and the second exponent value differing by more than one, to use the larger operand of the two operands as the sum value in the intermediate representation and to terminate the summation operation. In other words, at this point the smaller operand of the two operands is simply discarded and the larger operand used as the sum value in the intermediate representation.

The present techniques further enable special numbers which may be represented in floating format to be handled, and accordingly in some embodiments the intermediate representation comprises a special number section to store a special number indicator, wherein the special number indicator has a special value when the floating point value is an infinity or a not-a-number. This special number indicator may take a range of forms, for example on the one hand merely being a single bit indicating that floating point value is such a special number, or it may be a single bit that conditionally represents such a special number when other fields within the intermediate representation do not have a maximum value, or may be a number of bits enabling a more detailed representation to be held of the particular kind of special number, e.g. an infinity or not-a-number.

When such a special number is encountered in an input floating point value, it is in the nature of floating point summation that the sum value will also be such a special number (e.g. an infinity summed with any floating point value is infinity), and accordingly in some embodiments the summation circuitry comprises special number handling circuitry responsive to the special number indicator having the special value set, to set a special number indicator in the sum value to the special value and to terminate the summation operation.

It may be the case that the operation of the apparatus (in particular the summation circuitry), may result in a value being generated which is outside the range which can be represented in the intermediate representation, and accordingly in some embodiments the increment circuitry is responsive to performing the window shift operation on the sum value resulting in an exponent overflow of the exponent section of the sum value to set the special number indicator to the special value in the sum value.

When the special number indicator has the special value set, the present techniques further provide that at least one of the sections of the intermediate representation may then be reused in order to indicate, for example for diagnostic purposes, a cause of the floating point value being unrepresentable in the intermediate representation (e.g. an infinity or not-a-number). Accordingly, in some embodiments the apparatus further comprises syndrome circuitry responsive to the special number indicator having the special value set to cause syndrome information to be stored in at least one of the significand section, the shadow section and the special number section, wherein the syndrome information is indicative of a cause of the floating point value being the infinity or the not-a-number.

This syndrome information may take a variety of forms, but in some embodiments the syndrome information comprises at least a portion of a program counter of an instruction which caused the floating point value to be the infinity or the not-a-number. This portion of the program counter will typically be selected to be sufficient for the user to uniquely identify the instruction which caused the floating point value to be the infinity or the not-a-number (or at least to identify a relatively small number of instructions which can then be appropriately investigated). It may be the case that instructions are not individually tracked, but are tracked in groups (for example in an out-of order processor), and thus in some embodiments the syndrome information comprises at least a portion of a program counter indicative of a group of instructions, wherein an instruction of the group caused the infinity or the not-a-number.

The present techniques further recognise that processing efficiency with regard to the intermediate representation may be gained by implementing these techniques in context of a lane-based vector processing apparatus. Accordingly, in some embodiments the apparatus further comprises lane-based vector processing circuitry and wherein a length of the significand section corresponds to a first multiple of a lane size of the lane-based vector processing circuitry and a length of the shadow section corresponds to a second multiple of the lane size of the lane-based vector processing circuitry. This alignment of the significand section and the shadow section with lane sizes (or multiples thereof) of the lane-based vector processing circuitry enables the summation circuitry to benefit from the processing efficiencies which may be available from using a lane-based vector processing arrangement.

It may however be the case that at least one of these sections of the intermediate representation does not naturally align with a lane size of the lane-based vector processing configuration and in such a situation additional space available from the lane size may be made use of in order to extend one of these portions. For example, in some embodiments when a length of the second portion of the significand section is less than the lane size, the significand section further comprises a significand extension portion wherein the length of the second portion and a length of the significand extension portion sum to the length of the lane size. Thus, the significand extension portion usefully uses up the remaining available space in the lane size and thus also enables a larger significand representation to be handled.

Equally, where such available "additional" space in the lane size applies to the significand section it may well also apply to the shadow section (by virtue of the correspondence in size between the shadow section and the second portion of the significand portion) and accordingly in some embodiments when a length of the shadow section is less than the lane size, the shadow section further comprises a shadow extension portion wherein the length of the shadow section portion and a length of the shadow extension portion sum to the length of the lane size. A larger shadow may thus be provided, i.e. a greater overlap into the further window which is adjacent to and lower in the value range than the selected window in which the significand of the floating point value is being represented in the intermediate representation.

The exponent section of the intermediate representation may also be aligned with a lane size of the lane-based vector processing circuitry, but in the context of a summation operation being carried out the exponent values of two operands being summed are not usually themselves summed in the manner that the significands of each operand are, and accordingly in some embodiments the summation circuitry comprises circuitry to zero one of the first exponent value and the second exponent value when the exponent section is within a lane of the lane-based vector processing circuitry. Thus in fact by zeroing one of the first and second exponent values the exponent section of the operands can still be handled in the same manner as the other sections of the intermediate representation (i.e. summed) by the lane based vector processing circuitry, in that the remaining (unzeroed) value of one exponent value simply provides the exponent value for the sum value, and the exponent section can be efficiently handled in the same manner as the other sections of the intermediate representation by the lane-based vector processing circuitry.

The apparatus may be provided to be able to handle both unsigned and signed intermediate representations, and accordingly in some embodiments the intermediate representation of the floating point value is a signed intermediate representation and the apparatus further comprises circuitry for processing a positive intermediate representation of a positive value and for processing a negative intermediate representation of a negative value. Thus both positive and negative signed intermediate representations can be processed.

The particular manner in which these signed intermediate representations are handled may take a variety of forms, for example it may be provided that the apparatus has storage for at least one positive intermediate representation and storage for at least one negative intermediate representation, for example so that a summation can be carried out separately, and thus more simply, for each.

The summation circuitry may be configured to respond to the reception of a signed floating point value as an operand for the summation operation in a variety of ways, but in some embodiments the summation circuitry is responsive to reception of a signed floating point value and an input signed intermediate representation as the two operands to generate a result signed intermediate representation wherein: a positive component of the result signed intermediate representation holds a sum value of a positive component of the input signed intermediate representation and an absolute value of the signed floating point value, when the signed floating point value is a positive floating point number; and a negative component of the result signed intermediate representation holds a sum value of a negative component of the input signed intermediate representation and an absolute value of the signed floating point value, when the signed floating point value is a negative floating point number. Thus, when a signed floating point value is received, which the apparatus then converts into the intermediate representation, the apparatus may hold separate intermediate representations for positive values and negative values and therefore, with the knowledge of which is which, only the absolute value of each type need be considered and intermediate summations of positive values and negative values can be carried out, until the two need to be finally combined to produce an output floating point sum value.

In some embodiments the summation circuitry is responsive to reception of two signed intermediate representations as the two operands to generate a result signed intermediate representation wherein: a positive component of the result signed intermediate representation holds a sum value of positive components of the two input signed intermediate representations; and a negative component of the result signed intermediate representation holds a sum value of negative components of the two input signed intermediate representations.

When such separate intermediate positive and negative representations need combining to produce the output sum value, this may then be performed by subtracting the absolute value of the negative intermediate representation from the absolute value of the positive intermediate representation (or alternatively seen by adding the positive and negative intermediate representations) and accordingly in some embodiments the summation circuitry further comprises circuitry to combine the positive intermediate representation and the negative intermediate representation by subtracting an absolute value of the negative intermediate representation from an absolute value of the positive intermediate representation.

Although the intermediate representation could be output by the apparatus, it will generally be the case that, where the apparatus is arranged to receive floating point values from an external source, it is more useful for the apparatus itself to output values in floating point format, and accordingly in some embodiments the apparatus further comprises conversion circuitry to convert the intermediate representation to an output floating point value by selecting content of the significand section dependent on a most significant set bit position of the significand section to give a significand of the output floating point value and generating an exponent of the output floating point value from the exponent section of the intermediate representation in dependence on the most significant set bit position. The positioning of the significand within the significand section of the intermediate representation is important to identify the correct representation of the significand in floating point format and in such embodiments this may be done by identifying the most significant set bit position (e.g. by discarding leading zeros) of the significand section to then generate the significand of the output floating point value. The exponent of the output floating point value also has a dependency on this most significant set bit position, since the higher (further left) the significand is represented in the significand section, the greater an exponent of the output floating point value this corresponds to.

The present techniques also enable larger values of a floating point value to be represented in the intermediate representation in that in some embodiments the apparatus further comprises carry circuitry responsive to the exponent section having a maximum value to propagate a carry from the significand section to the shadow section, and wherein when the exponent section has the maximum value the significand section and the shadow section are concatenated to store the significand of the floating point value. Thus, when the exponent section has this maximum value, and thus otherwise a limit has been reached in terms of the greatest significand which can be represented in the significand section, such embodiments provide that the shadow section may then be made use of to extend the significand section (by concatenation of the two) in order to represent a larger significand.

Indeed, not only may the significand and shadow sections be concatenated in this manner, but more generally any two (at least) of the significand, shadow and special number sections may be joined together in this manner in order to store a larger-than-usual significand. Accordingly, in some embodiments when the exponent section has the maximum value at least two of the significand section, the shadow section and the special number section are concatenated to store the significand of the floating point value.

In some embodiments, a third portion of the significand section corresponds to a further overlap into a still further window which is adjacent to and lower in the value range than the further window. Thus in such embodiments the intermediate representation can maintain shadow sections corresponding to two windows adjacent to the window in which the significand is being represented, and accordingly window shifts of more than one window can thus be accommodated.

The apparatus may be responsive to at least one dedicated instruction which causes particular aspects of its functionality with regard to intermediate representations of floating point values to be carried out. For example, in some embodiments the apparatus is responsive to an instruction which specifies the floating point value to cause storage circuitry to store the intermediate representation of the floating point value. Thus, having identified the floating point value specified by the instruction the apparatus can convert this into an intermediate representation thereof and store it in the storage circuitry. The apparatus may also be responsive to at least one summation instruction which defines the operands for the summation operation. As mentioned above, these summands may be specified in a number of ways, for example as immediate values, or with reference to particular storage locations such as a local register, and in some embodiments the apparatus is responsive to a summation instruction which specifies an immediate summand to perform the summation operation.

At least some embodiments provide a computer program product on which is stored in a non-transient fashion a computer program which when executed on a computing device causes the computing device to operate as the apparatus in any of the configurations described above.

At least some embodiments provide software which when executed on a computing device causes the computing device to operate as the apparatus in any of the configurations described above.

At least some embodiments provide a method of storing an intermediate representation of a floating point value, the method comprising storing a representation of a significand of the floating point value in a significand section of the intermediate representation, wherein a less significant portion of an exponent of the floating point value defines a range of positions within the significand section where the representation of the significand is to be stored; storing a representation of a more significant portion of the exponent of the floating point value in an exponent section of the intermediate representation, which indicates a selected window of multiple contiguous windows spanning a value range of a format of the floating point value, wherein a first portion of the significand section corresponds to the selected window and wherein a second portion of the significand section corresponds to an overlap into a further window which is adjacent to and lower in the value range than the selected window; and storing values for populating the second portion of the significand section when the representation of the significand of the floating point value is moved to a higher window which is adjacent to and higher in the value range than the selected window.

At least some embodiments provide a computer program product on which is stored in a non-transient fashion a computer program which when executed on a computing device causes the computing device to carry out the method described above, possibly adapted appropriately in accordance with any of the above described configurations of the corresponding apparatus.

At least some embodiments provide software which when executed on a computing device causes the computing device to carry out the method described above, possibly adapted appropriately in accordance with any of the above described configurations of the corresponding apparatus.

At least some embodiments provide an apparatus comprising means for storing a intermediate representation of a floating point value, the means comprising means for storing a representation of a significand of the floating point value in a significand section of the intermediate representation, wherein a less significant portion of an exponent of the floating point value defines a range of positions within the significand section where the representation of the significand is to be stored; means for storing a representation of a more significant portion of the exponent of the floating point value in an exponent section of the intermediate representation, which indicates a selected window of multiple contiguous windows spanning a value range of a format of the floating point value, wherein a first portion of the significand section corresponds to the selected window and wherein a second portion of the significand section corresponds to an overlap into a further window which is adjacent to and lower in the value range than the selected window; and means for storing values for populating the second portion of the significand section when the representation of the significand of the floating point value is moved to a higher window which is adjacent to and higher in the value range than the selected window.

Some particular embodiments are now described with reference to the figures.

FIG. 1 illustrates how the intermediate representation referred to herein as a "Sliding Window Accumulator" (SWAcc) is used to represent three different binary 64-bit floating point values (which in this example are double precision IEEE 754 format values). The horizontal line in FIG. 1 shows the value range of this floating point format, i.e. the range of possible values which can be represented by such a double precision 64-bit binary value. Thus, as labelled this horizontal line effectively represents a 2099-bit fixed point value. The relative positions of several powers of two across this value range are shown, together with range of intermediate representation exponent values (e), given by the four most significant bits of the relevant power of two. Three example floating point values X, Y, and Z are set out at the top of the figure, showing their binary exponents E and their trailing significands T. Note that the full 11-bit content of each exponent E is shown, but only the outermost bit values of the 52-bit significands are shown for clarity of illustration. The relative positions with respect to the horizontal value range line of each of these three floating point values is shown in the figure, dictated by their respective e values, with the implicit leading significand bit of each also shown. When converting each of these floating point values into a SWAcc, 180 bits of significand value are copied into a "pure window" of the SWAcc, formed of two components, which will be explained in more detailed below, labelled w_m and w_l. This copying with respect to the floating point value Z is shown in FIG. 1. Note that in addition, also shown in FIG. 1, the top 52 bits of these 180 bits are also copied into a "shadow" portion of the SWAcc and the corresponding exponent value e (in this example being 8) is also noted.

Figure 2:
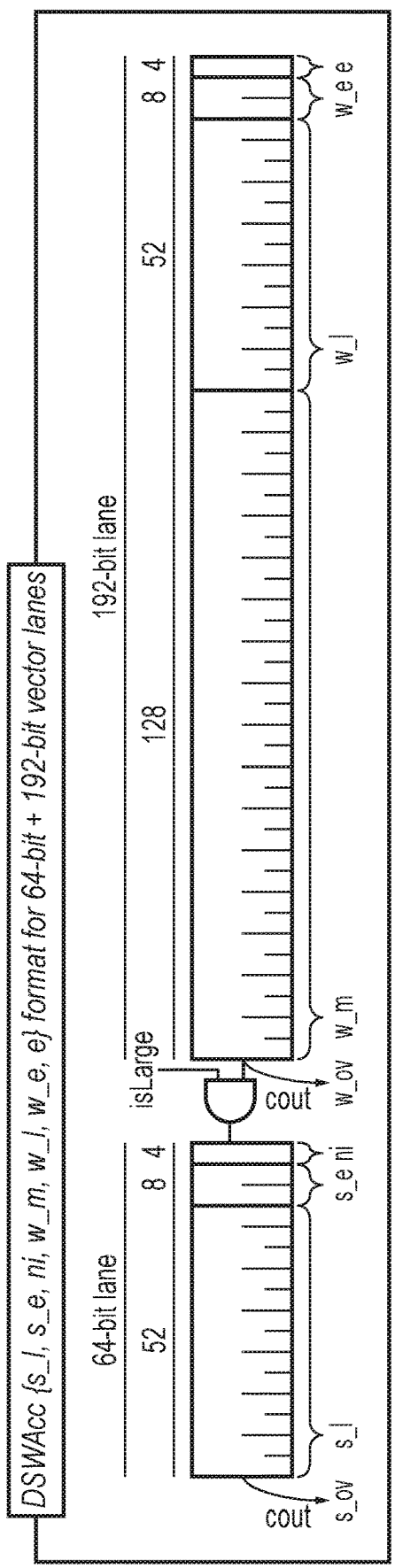
FIG. 2 illustrates in more detail the intermediate representation of the present techniques for a double precision 64-bit floating point value including some associated circuitry in one embodiment.

FIG. 2 shows an example double precision SWAcc (labelled in the figure as "DSWAcc") which is used in one embodiment as the internal representation of the floating point values. This DSWAcc can be seen to be a 256-bit vector and moreover the two main portions of this DSWAcc are labelled as corresponding to a 64-bit lane and a 192-bit lane, which refers to the possibility for this DSWAcc to be processed by lane-based vector processing circuitry, as will be discussed in more detail below with reference to FIG. 10. Note for now that 64-bit lanes of such a lane-based vector processing apparatus may therefore be readily adapted to process such a DSWAcc. The fields of the DSWAcc shown in FIG. 2 break down into two main parts, on the left those relating to the shadow and on the right those relating to the significand and exponent of the corresponding floating point value, with reference to the window it occupies in the sequence of multiple contiguous windows (bounded by e values) as shown in FIG. 1. The window fields shown are the main window w_m (128-bit), the lower window w_l (52-bit), the window extension w_e (8-bit), whilst the two regions which represent the shadow are the lower shadow s_l (52-bit) and the shadow extension s_e (8-bit). The terminology used herein is that the "full window" is {w_m, w_l, w_e}, the "pure window" is {w_m, w_l}, the "full shadow" is {s_l, s_e} and the "pure shadow" is {s_l}. Also shown at the far right of the window fields is the exponent representation e (4-bit) and at the right of the shadow section the special number portion ni (4-bit). Further, the window fields are shown having a significand overflow w_ov and the shadow portion is shown having a shadow overflow s_ov. Finally, the two main portions of the DSWAcc are shown connected by AND logic combining the significand overflow value w_ov and an "isLarge" value, which feeds into the ni field of the shadow section and will be described in more detail below.

Figure 3:
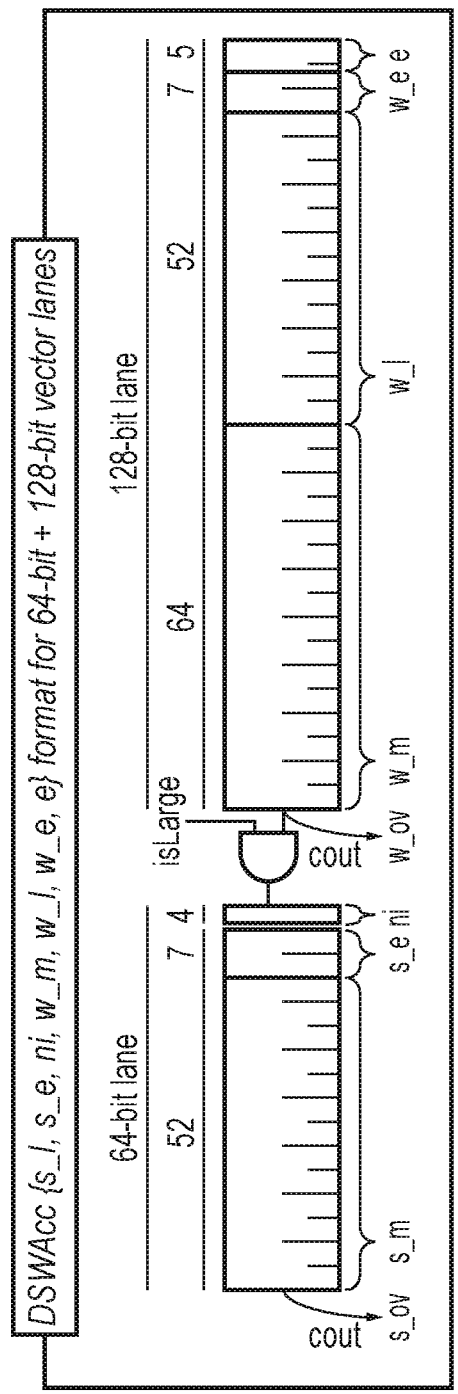
FIG. 3 shows an alternative intermediate representation of the present techniques to that shown in FIG. 2 in one embodiment.

The particular bit sizes of the components of a DSWAcc may take other forms, and FIG. 3 illustrates another such possible format for a DSWAcc. The DSWAcc of FIG. 3 occupies less space than the DSWAcc of FIG. 2 in that whilst the shadow section still occupies a 64-bit lane, the full window section in this example corresponds to a 128-bit lane. Of course, the representation of the DSWAcc used in FIG. 3 is only able to hold a smaller significand than that of FIG. 2, but this represents an implementation trade off depending on the space available for handling and storing such a DSWAcc and the desired precision of the output of the apparatus. Alternative encodings may for example use a 32 window DSWAcc implementation with between 177 and 191-bits, depending on the w_e and s_e sizes). Some encodings may include a sign bit for explicit signed SWAcc representation of signed floating point values. A SWAcc encoding for binary32 can be achieved in 74 bits with a 23-bit shadow and a 20-bit w_m. One alternative in 81 bits uses a 32-bit w_m, 23-bit w_l and 3 bit e. Other example encodings include reducing the trailing significand to 20 bits which permits a 64-bit encoding with 20-bit w_m, or a 16-bit window with a second, 4-bit shadow.

Figure 4:
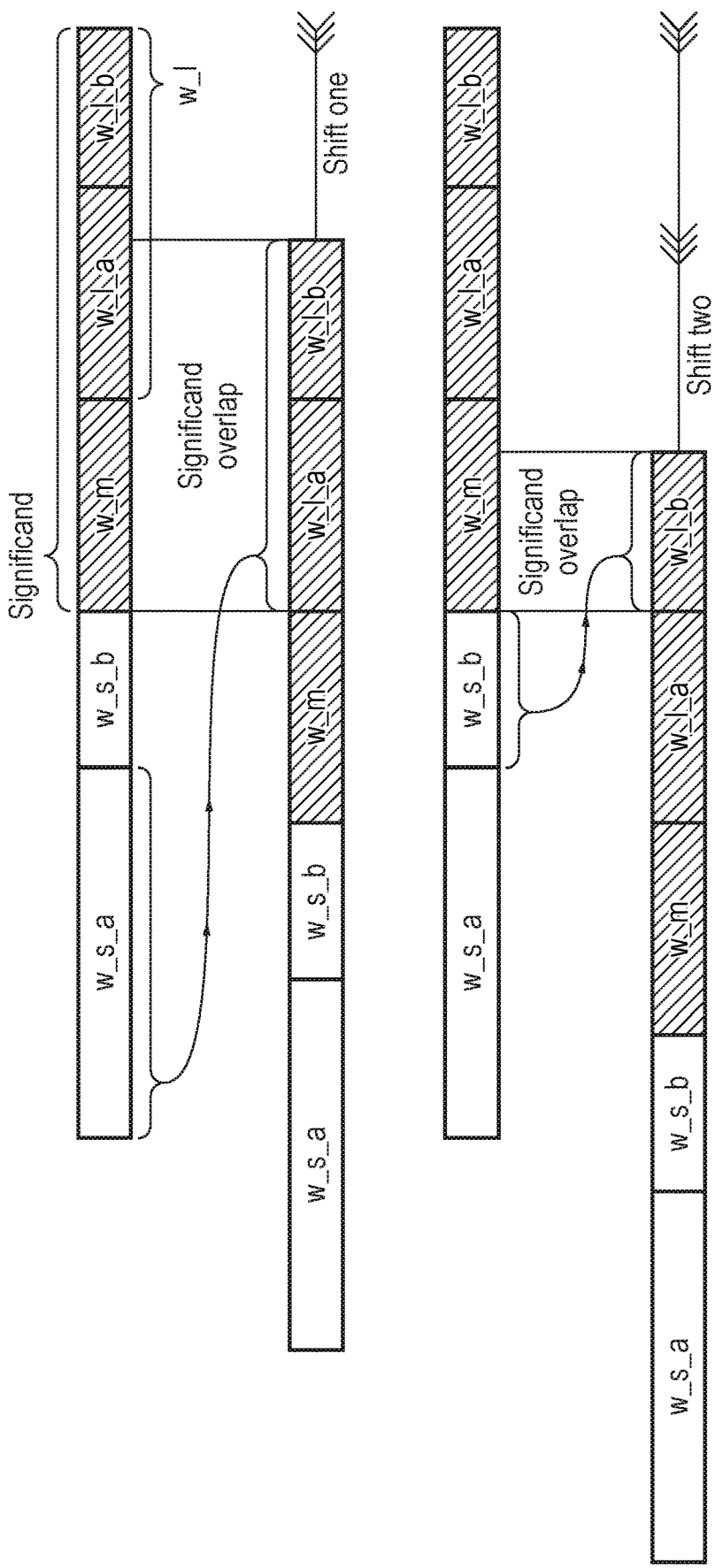
FIG. 4 shows an alternative intermediate representation of the present techniques to that shown in FIG. 2, having two shadow sections, in one embodiment.

Another particular example of the format is shown in FIG. 4, where it can be seen that there are two shadow sections (w_s_a and w_s_b), where the first shadow section (w_s_a) is provided to hold a shadow copy of the current window (exponent value e) bits which overlap with the next higher window's (exponent value e+1) lower windows (w_l_a and w_l_b) and the second shadow (w_s_b) is provided to hold a shadow copy of the current window (exponent value e) bits which overlap with the second higher window's (exponent value e+2) lower windows (w_l_a and w_l_b). This kind of intermediate representation thus allows window shifts of two windows to be performed.

Figure 5:
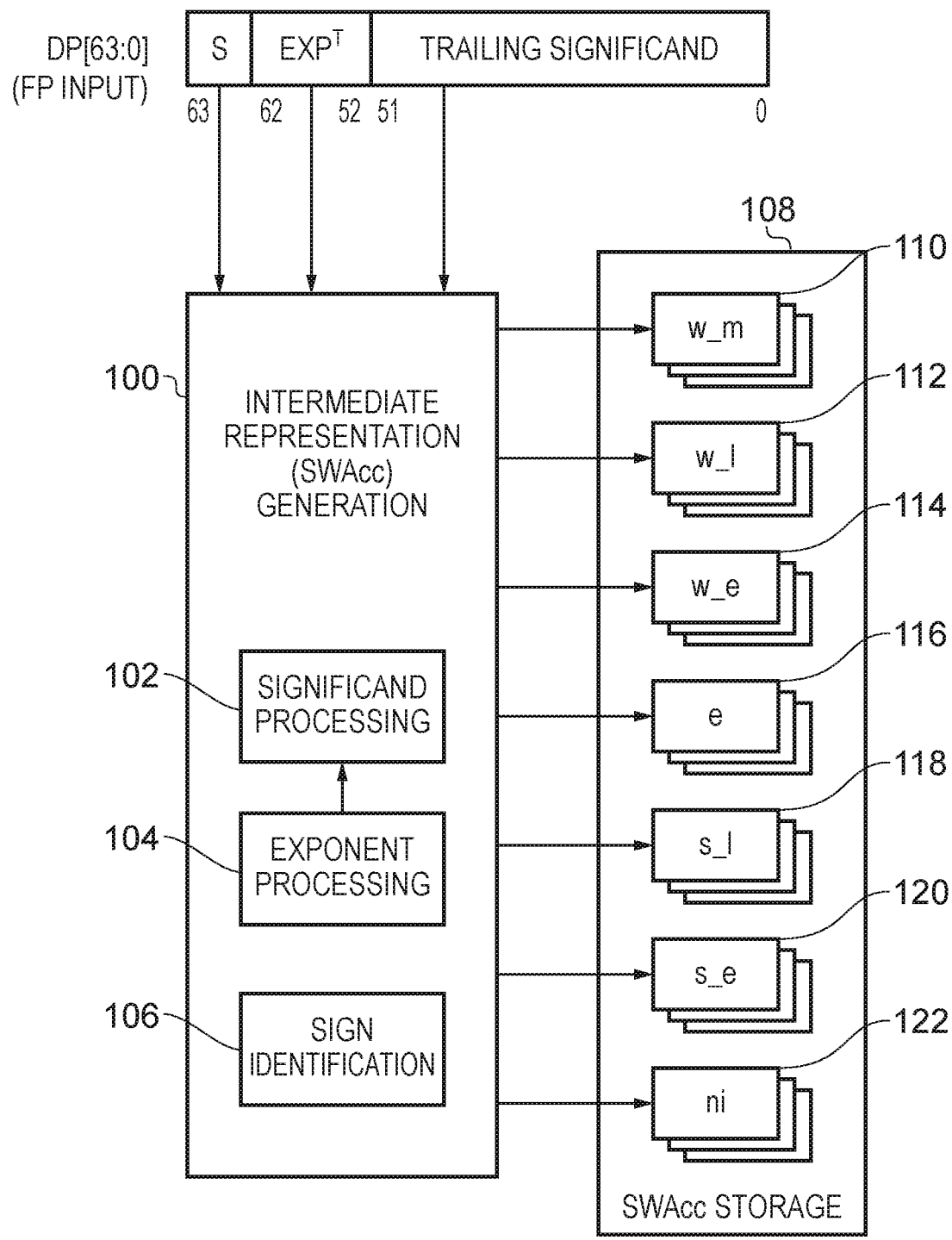
FIG. 5 schematically illustrates circuitry for generating and storing the intermediate representation of the present techniques from an input double precision floating point value in one embodiment.

FIG. 5 schematically illustrates circuitry for SWAcc generation and storage in one embodiment. At the top of the figure a double precision 64-bit floating point input value is shown with its components being received by SWAcc generation circuitry 100. The SWAcc generation circuitry 100 is schematically shown as comprising three components namely the significand processing circuitry 102, the exponent processing circuitry 104 and the sign identification circuitry 106. Note that the exponent processing circuitry 104 has an output leading to the significand processing circuitry 102, in order to allow the significand processing circuitry 102 to appropriately determine the relevant content of the significand fields. Also shown in FIG. 5 is the SWAcc storage 108 which is schematically illustrated as having storage capability for the SWAcc components w_m, w_l, w_e, e, s_l, s_e and ni in the storage components 110-122. SWAcc storage 108 could be a register or registers, local cache storage, storage in memory and so on. Note also that the SWAcc storage 108 in fact shows three separate storage elements for each of these components 110-122, which are used in this embodiment to store, respectively, SWAcc representations corresponding to an unsigned floating point value, a positive signed floating point value and a negative signed floating point value. Which of these storage components is used for the floating point value received is determined by the sign identification circuitry 106 from an examination of the floating point value received by the SWAcc generation circuitry 100. This processing of signed and unsigned floating point values will be described in more detail below with respect to FIGS. 11A and 11B.

Figure 6:
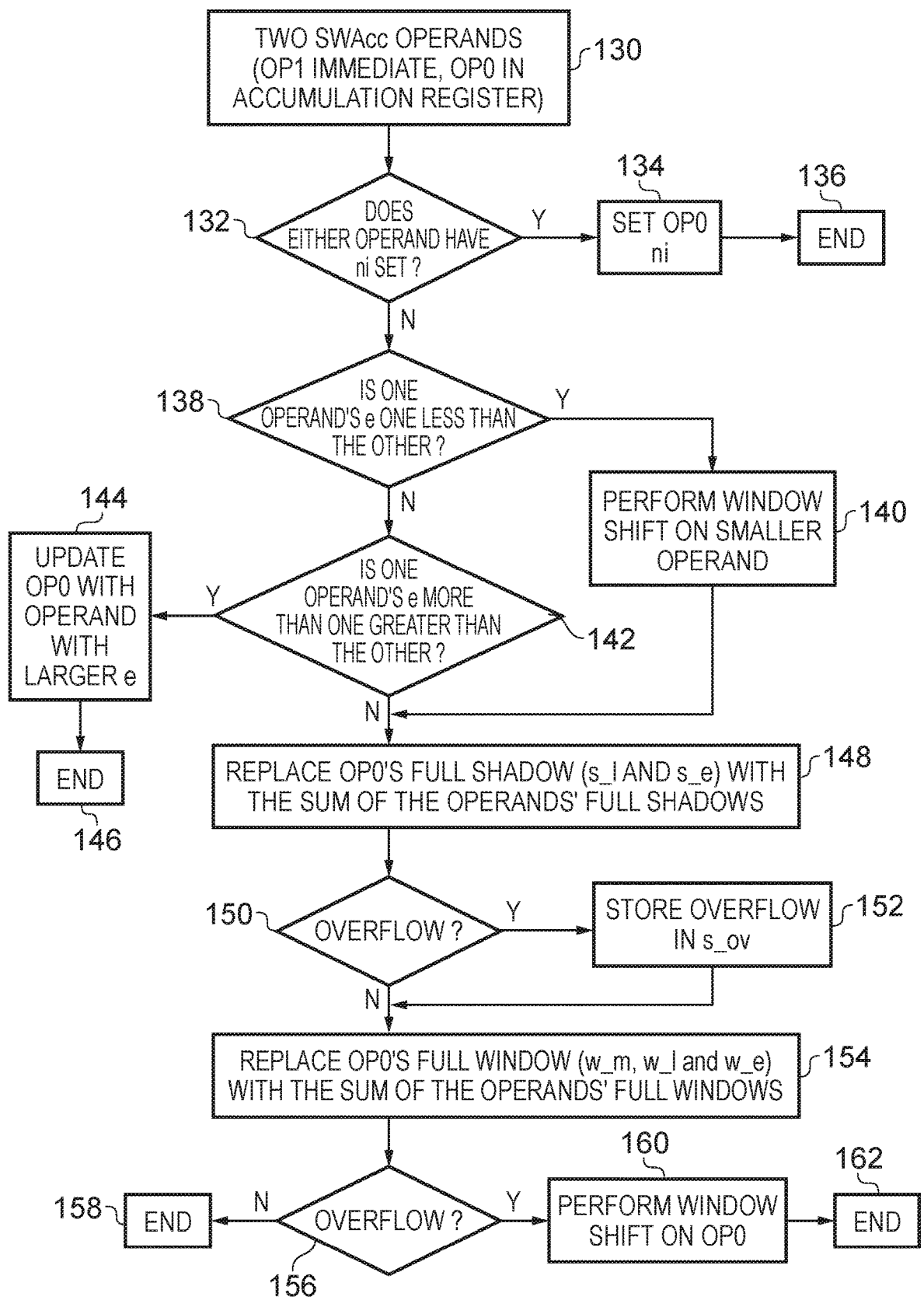
FIG. 6 shows a sequence of steps which are carried out in order to sum two operands in the intermediate representation of the present techniques according to the method of one embodiment.

An apparatus of one embodiment (for example as discussed below with respect to FIG. 9A) is capable of performing a summation operation on two SWAcc operands, this being carried out in one particular embodiment according to the method steps shown in FIG. 6. The flow begins at step 130 where two SWAcc operands are to be summed. In this example, the summation operation is in fact an accumulation operation, where one operand OP1 is provided as an immediate value, whilst the other operand OP0 is held in the accumulation register where the accumulated sum value is to be stored. Then at step 132 it is determined if either operand has the special number value ni set indicating that the corresponding floating point value is either an infinity a not-a-number. If this is the case the flow proceeds to step 134 where the ni field of OP0 is correspondingly set and the flow ends at step 136. Otherwise, the flow proceeds to step 138 where it is first determined if one operand's e value is one less than that of the other. If this is the case then the flow proceeds to step 140 where a window shift operation on the smaller operand (the operand having the smaller e value) is carried out to shift this operand's representation to the same window as that of the larger operand. The flow then proceeds to step 148. If, however, the two operands e values do not differ by one, then at step 142 it is determined if they differ by more than one. This being the case, flow proceeds to step 144 where OP0 is updated to hold the value of the operand with the larger e value and the summation operation then concludes at step 146. Otherwise, having reached step 148 OP0's full shadow (s_l, s_e) is replaced with the sum of the operands' full shadows and at step 150 it is determined if the summation of these full shadows has resulted in a shadow overflow. If it has then the flow proceeds via step 152 where this shadow overflow is stored in a shadow overflow register (s_ov). Then at step 154 OP0's full window (w_m, w_l and w_e) is replaced with the sum of the operands' full windows. It is then determined at step 156 if the summation of the operands' full windows has resulted in a significand overflow and if it has not then the flow concludes at step 158. If, however, such a significand overflow has occurred then at step 160 a window shift is performed on OP0 in order to re-represent it in the next higher window. The flow then terminates at step 162.

Figure 7:
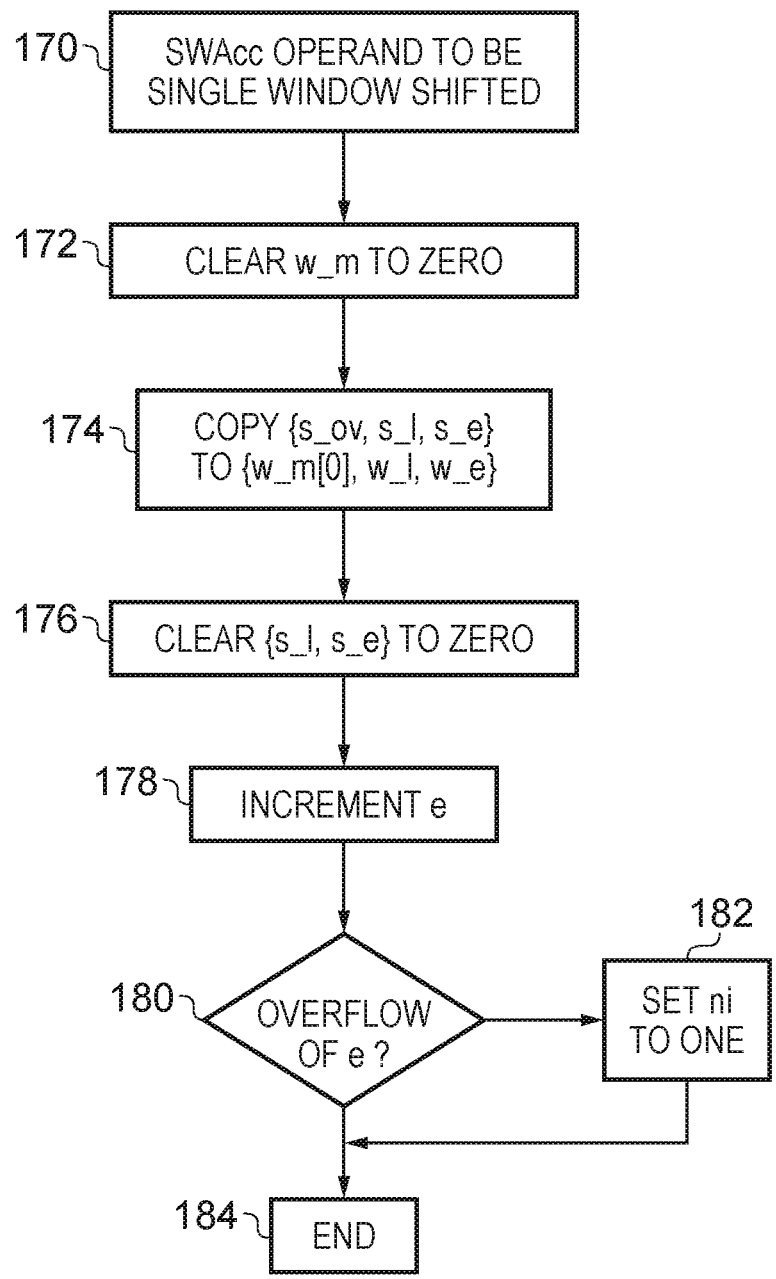
FIG. 7 shows a sequence of steps which are taken in order to perform a window shift operation on an operand in the intermediate representation of the present techniques in one embodiment.

FIG. 7 shows a sequence of steps which are taken in one embodiment of the present techniques in order to carry out a single window shift. The flow begins at step 170 where there is a SWAcc operand to be single window shifted. At step 172 w_m is cleared to zero and at step 174 the values of s_ov, s_l and s_e are respectively copied to w_m[0] (i.e. the least significant bit of the main window w_m), w_l and w_e respectively. Then at step 176 the shadow section components s_l and s_e are both zeroed. At step 178 the value of e in the SWAcc is incremented by one. At step 180 it is then determined if this increment of e has resulted in its overflow and if it has the flow proceeds via step 182, where the ni value of this SWAcc is set to one to indicate that this window shift has resulted in the SWAcc moving into a region which cannot be represented. The flow ends at step 184.

Figure 8A:
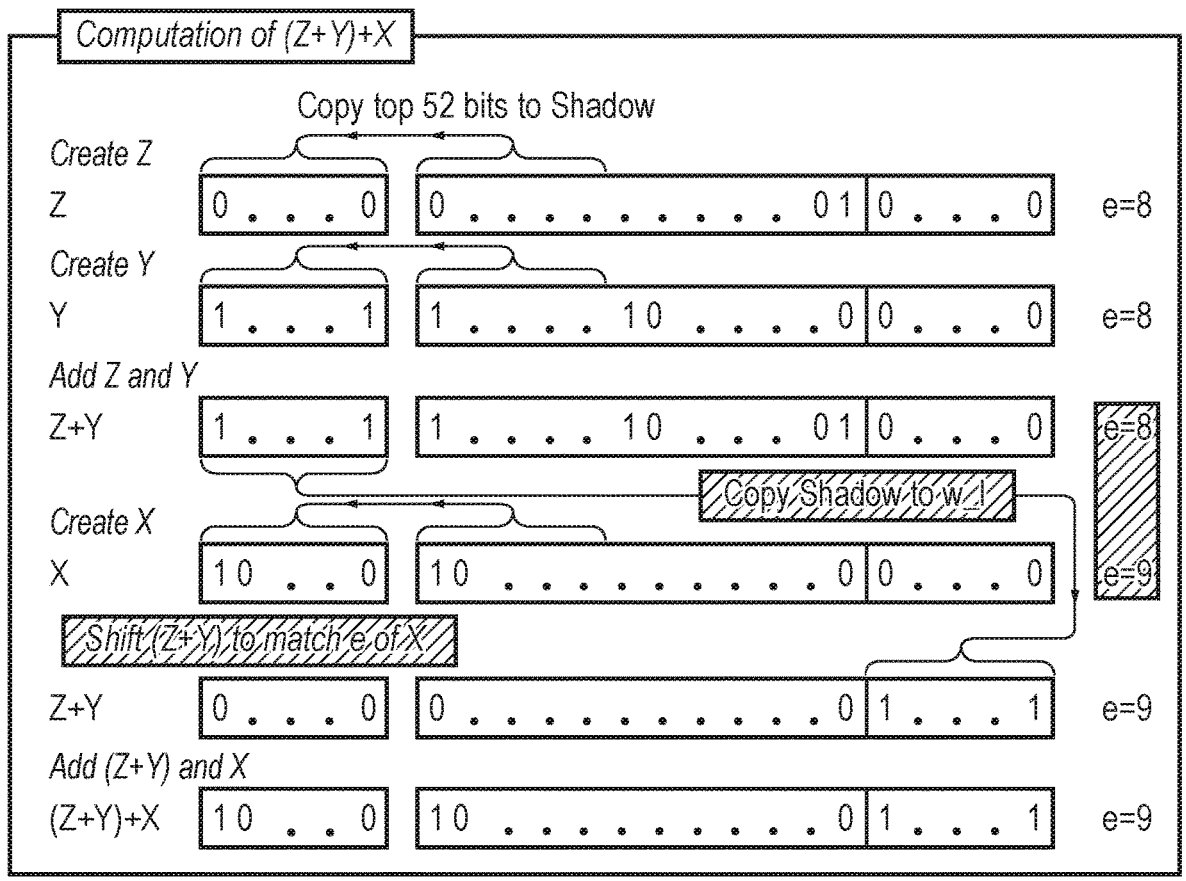
FIGS. 8A and 8B illustrate the order independence of the calculation of the sum of three floating point values according to the present techniques.
Figure 8B:
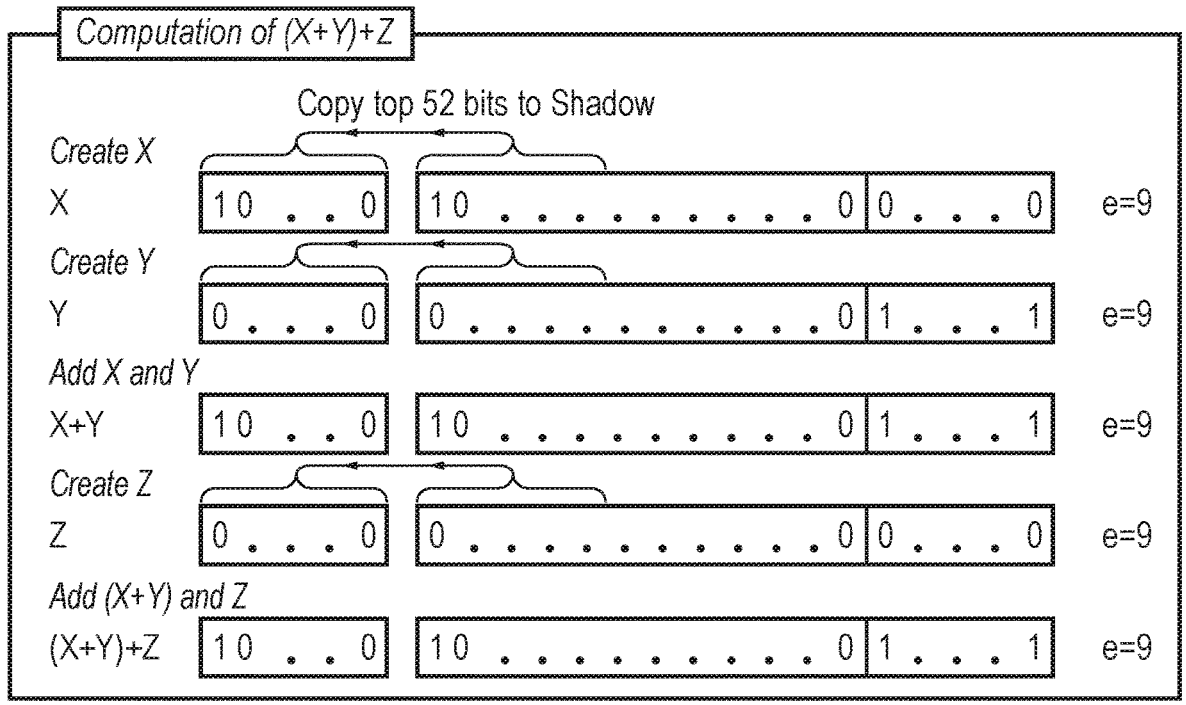

Returning to a consideration of the three example floating point values X, Y and Z shown in FIG. 1, FIGS. 8A and 8B illustrate two different orderings of the summation of these three values in the SWAcc representation, namely (Z+Y)+X in FIG. 8A and (X+Y)+Z in FIG. 8B. In FIG. 8A the creation of the SWAcc representations of Z and Y are shown in the first two lines, where each is represented in the same window, namely where e=8. The top 52 bits of the main window w_m of each is copied into the lower shadow section s_l. These SWAcc representations are then added in the third line of FIG. 8A to give Z+Y in SWAcc representation. Then in the next line the SWAcc representation of X is created, but note that this results in X being in one window higher (e=9, compared to e=8) than the sum Z+Y. A single window shift is therefore performed on Z+Y (this value having the lower value of e) to represent it within the same window as X (i.e. e=9). Thus shifted, which as illustrated in the penultimate line of FIG. 8A includes copying the lower shadow s_l to the lower window w_l of Z+Y, Z+Y and X are then summed to give (Z+Y)+X as shown in the final line of FIG. 8A. FIG. 8B shows the computation of (X+Y)+Z, where it should be noted that this illustration includes (though not explicitly illustrated) window shifts of Y and (separately) Z in order to firstly align Y with the window (e=9) of X, and then to align Z with the window (e=9) of X+Y. Note in particular that the values shown in the final line of each of FIGS. 8A and 8B, i.e. (Z+Y)+X and (X+Y)+Z respectively, are the same, which would not be the case if the shadow had not been available for the step where (Z+Y) is shifted to the e=9 window. In other words, the use of the SWAcc representations and the techniques associated therewith have ensured that the summation of X, Y and Z is associative, i.e. the order in which the three operands are summed does not affect the final result.

Figure 9A:
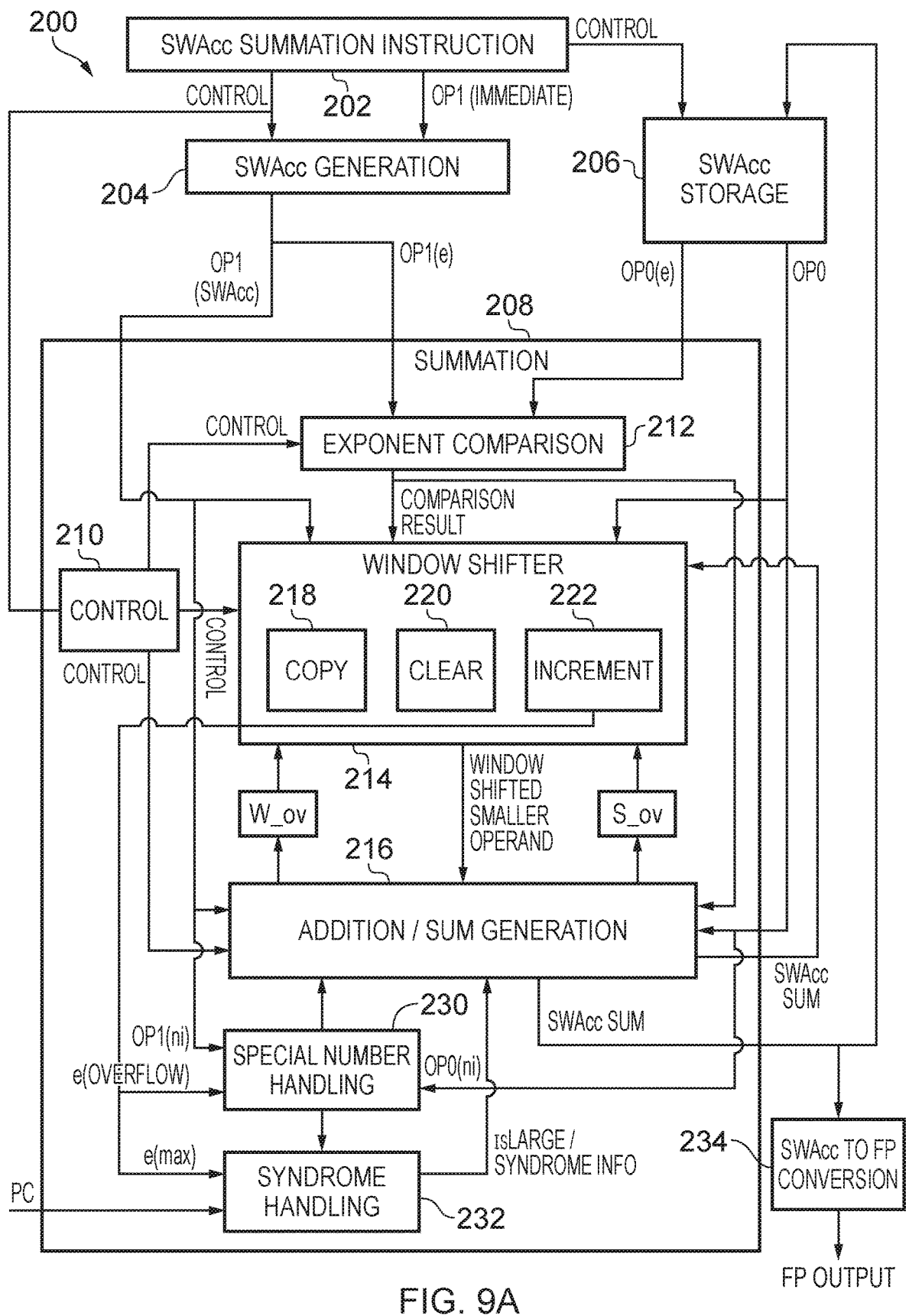
FIG. 9A schematically illustrates an apparatus for performing floating point summation using the intermediate representation of the present techniques in one embodiment.

FIG. 9A schematically illustrates an apparatus 200 in one embodiment. The main components of the apparatus 200 are the SWAcc summation instruction circuitry 202, the SWAcc generation circuitry 204, the SWAcc storage circuitry 206 and the summation circuitry 208. The reception of a SWAcc summation instruction by the apparatus 200 configures its operation for performing the summation of two SWAcc operands. In fact, the SWAcc summation instruction received in the example of FIG. 9A is an accumulate instruction which causes an immediate value OP1 (in floating point format) in the instruction to be added to a floating point value already in the SWAcc format (OP0) held in the SWAcc storage 206. The SWAcc summation instruction circuitry passes the immediate value OP1 to the SWAcc generation circuitry 204, which converts this into the SWAcc representation, as described above. Other control information defined by the SWAcc summation instruction is passed to the control circuitry 210 of the summation circuitry 208, in order to configure how the main components of the summation circuitry 208 operate for this accumulate summation operation.

The main components of the summation circuitry 208 other than the control circuitry 210 are the exponent comparison circuitry 212, the window shifter circuitry 214 and the addition/sum generation circuitry 216. Once the SWAcc generation circuitry 204 has generated the SWAcc representation of OP1, the exponent value thereof OP1(e) is passed to the exponent comparison circuitry 212. Similarly, the exponent value of the SWAcc value to which OP1 is to be accumulated (OP0) is retrieved from SWAcc storage 206 (initiated by reception of a control signal from the SWAcc summation instruction circuitry and received by the SWAcc storage 206). The exponent value of this operand OP1(e) is also passed to the exponent comparison circuitry 212. The exponent comparison circuitry 212 compares the relative values of OP1(e) and OP0(e) and this comparison result is passed to the window shifter circuitry 214 and to the addition/sum generation circuitry 216. If OP1(e) and OP0(e) are the same, then no window shift needs to be performed and the addition/sum generation circuitry 216 can perform the addition procedure on the values of OP1 and OP0 as they are received from the SWAcc generation circuitry 204 and the SWAcc storage circuitry 206 respectively. Equally, if OP1(e) and OP0(e) differ by more than one then a window shift is not carried out and the addition/sum generation circuitry generates the SWAcc sum simply as the value of the operand with the larger exponent value, this being passed back to the SWAcc storage circuitry 206 for storage. If the summation of the full windows (w_m, w_l and w_e) by the addition/sum generation circuitry 216 (carrying out step 154 of FIG. 6) results in a significand overflow (step 156) then the window shifter circuitry 214 is used perform (step 160) a window shift on OP0 in order to re-represent it in the next higher window.

If, however, the exponent comparison circuitry 212 determines that the exponent values of the operands differ by one, then a window shift operation is carried out by the window shifter circuitry 214. In order to be able to carry out this operation, the window shifter circuitry 214 is provided with copy circuitry 218, clearing circuitry 220 and incrementing circuitry 222. These components essentially carry out the steps shown in FIG. 7 for performing a single window shift, step 202 being carried out by copy circuitry 218, steps 204 and 206 being carried out by clearing circuitry 220, and step 208 being carried out by increment circuitry 222. Note that a path leads from increment circuitry 222 to each of the special number handling circuitry 230 and the syndrome handling circuitry 232. If the incrementing of e (step 178 carried out by increment circuitry 222) results in an overflow of e, then the special number handling circuitry 230 sets the value of ni in the operand on which the window shift was performed to indicate that the window shift has moved this operand out of the representable range. The special number handling circuitry 230 carries out the setting of ni by intervention in the addition/sum generation circuitry 213, and as a result, when such an e overflow occurs, the SWAcc sum will be generated by the addition/sum generation circuitry 216 with the ni value correspondingly set. The syndrome handling circuitry 232 also receives information about the value of e from the window shifter circuitry 214, in particular when e has a maximum possible value. In the example of a DSWAcc such as that shown in FIG. 2 this is when e=0xF, and a value which also has w_m[128] set will be too large to represent in floating point binary 64 format, so the value will effectively be infinity if converted to a double precision floating point value. Nevertheless, it is useful as an intermediate value since the difference between a positive and negative SWAcc value may bring the final result back into range.

Furthermore, note that in this example the shadow is redundant when e=0xF (since a shift to a higher value of e is not possible), and thus in the embodiment shown in FIG. 9A this value of e is used in a SWAcc to indicate that the "full window", which would usually only comprise w_m, w_l and w_e, further comprises s_l, s_e and ni, i.e. is 64 bits larger for a DSWAcc. Hence, the ni value only means infinity or not-a-number, when e!=0xF. Refer to FIGS. 2 and 3 to see how the carry between the portions of the DWSAcc normally corresponding to the full window (w_m, w_l, and w_e) and the full shadow (s_l and s_e) is dependent on "isLarge" i.e. the value isLarge is set when e=0xF. FIG. 9A illustrates this IsLarge value being passed from the syndrome handling circuitry 232 to the addition sum generation circuitry 216.

Note also that the syndrome handling circuitry 232 has an input from special number handling circuitry 230, which is used to indicate to the syndrome handling circuitry 232 when one of the operands is a special number. Since the full window, full shadow and most of e are meaningless for special number values, the syndrome handling circuitry 232 is arranged to use these portions of the SWAcc to store syndrome information, which may be any system information useful to the user to diagnose a cause of the special number, but in the example shown in FIG. 9A this is the program counter (PC) value which is received by the syndrome handling circuitry 232 (or at least enough bits of the PC to identify the instruction with high probability, for example it may be possible to discard some most significant bits and any static least significant bits). This syndrome information is then propagated by the addition/sum generation circuitry 216, such that the SWAcc value generated carries this syndrome information.

The apparatus 200 further comprises SWAcc to floating point conversion circuitry 234, which takes a SWAcc value and converts it into an appropriate floating point format, for example, the above discussed binary 64 format. This conversion is essentially the inverse of the above-described operations for converting a floating point value into SWAcc format, and thus requires finding the most significant bit of the full window with the set in order to determine how much its full window should be shifted (right) and also the value of E in a resulting binary 64 value.

Figure 9B:
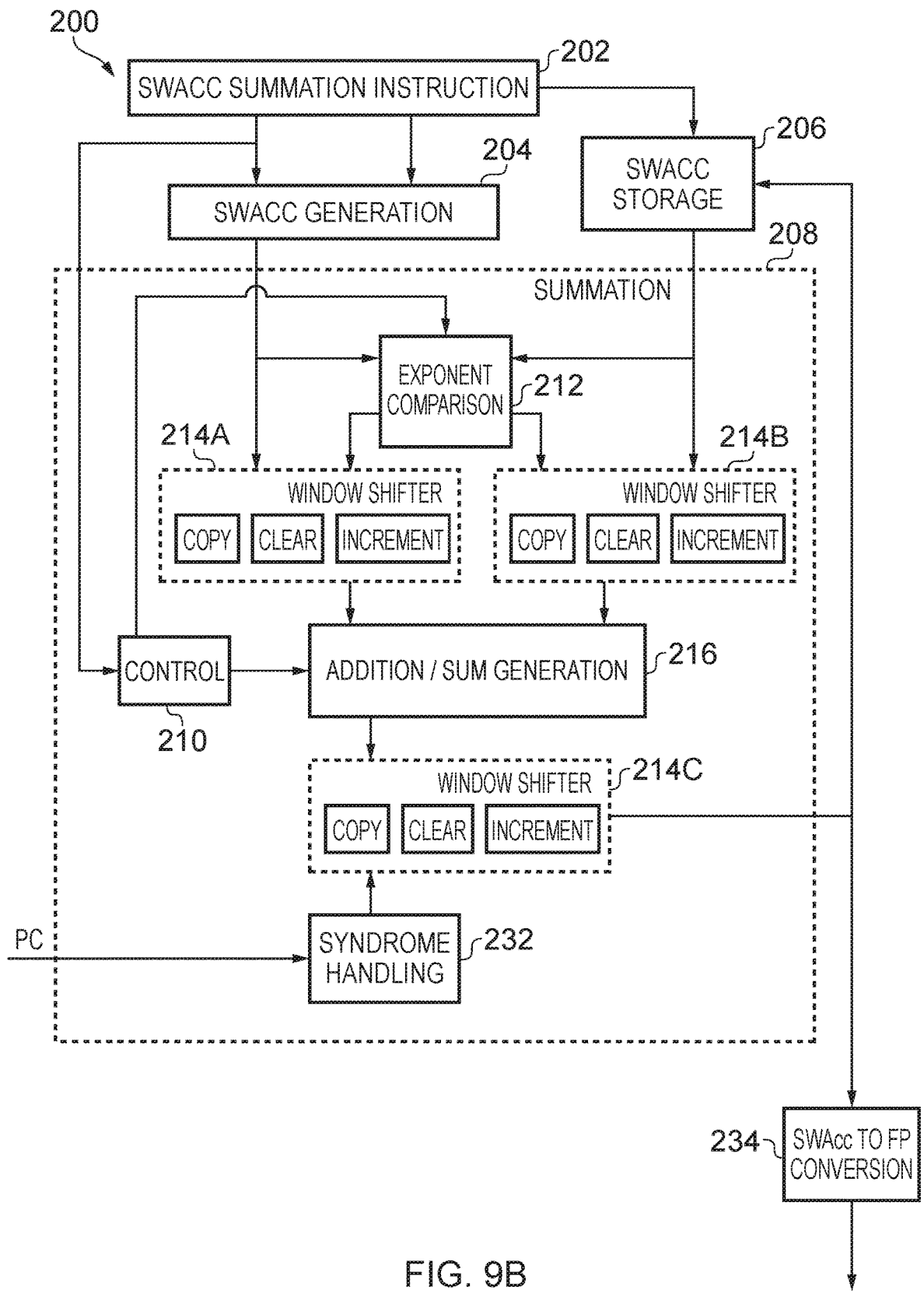
FIG. 9B schematically illustrates an apparatus for performing floating point summation using the intermediate representation of the present techniques which is a variant on that shown in FIG. 9A.

FIG. 9B illustrates an alternative configuration of the apparatus 200 of FIG. 9A, which is shown in a slightly simplified format. Moreover the same reference numerals are used for the components which are repeated between FIGS. 9A and 9B, and these are not described again here. The key difference between the apparatus of FIGS. 9A and 9B is that the window shift circuitry 214 is split into three parts in FIG. 9B, as shown by circuitry 214A, 214B and 214C. The logic which provides each of these window shifters is relatively compact—essentially a set of multiplexers—and this approach is therefore not greatly area-expensive.

Figure 10:
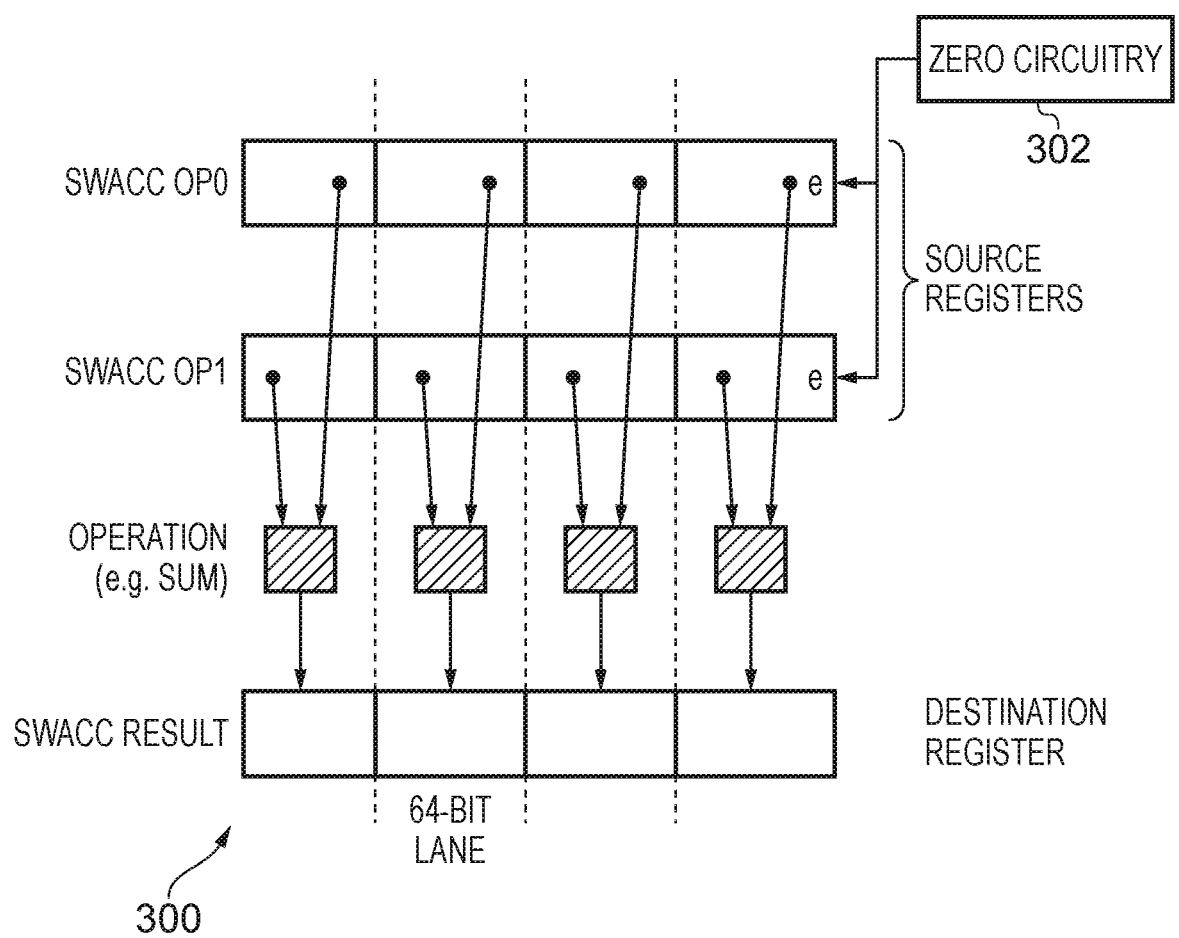
FIG. 10 schematically illustrates the application of lane-based vector processing to the present techniques in one embodiment.

FIG. 10 schematically illustrates lane-based processing circuitry which may efficiently implement the present techniques, in particular for the addition of two SWAcc values. As mentioned above with reference to FIGS. 2 and 3, the configuration of a SWAcc value (a DSWAcc value in the examples of FIG. 2 and FIG. 3) may be defined such that components of the SWAcc value align with the lanes of the lane-based vector processing circuitry. The lane-based vector processing circuitry 300 shown in FIG. 10 has four 64-bit lanes, such that a DSWAcc as shown in FIG. 2 may be accommodated by these four lanes. Thus, each 64-bit portion of each SWAcc operand is handled in parallel by the lane-based vector processing circuitry and a corresponding operation carried out in parallel on each, for example the above discussed sum operation, in order to generate the corresponding 64-bit portion of the SWAcc result value. Additionally, note that the lane-based vector processing circuitry 300 shown in FIG. 10 further comprises zeroing circuitry 302, which is arranged to zero the exponent e component only in the lane in which the e value is processed. By zeroing one of these e values, the summation mechanism provided to carry out the sum operation in the lane-based vector processing circuitry can then be used without further adaptation, in that the e value in the SWAcc result will then just be provided by the non-zeroed e value from one of the operands. It should be recalled that in the context of SWAcc summation, this is performed on SWAcc operands which have the same e value and therefore the e value of the SWAcc result is correctly determined, namely being the same as that of both the input operands.

Figures 11A, 11B:
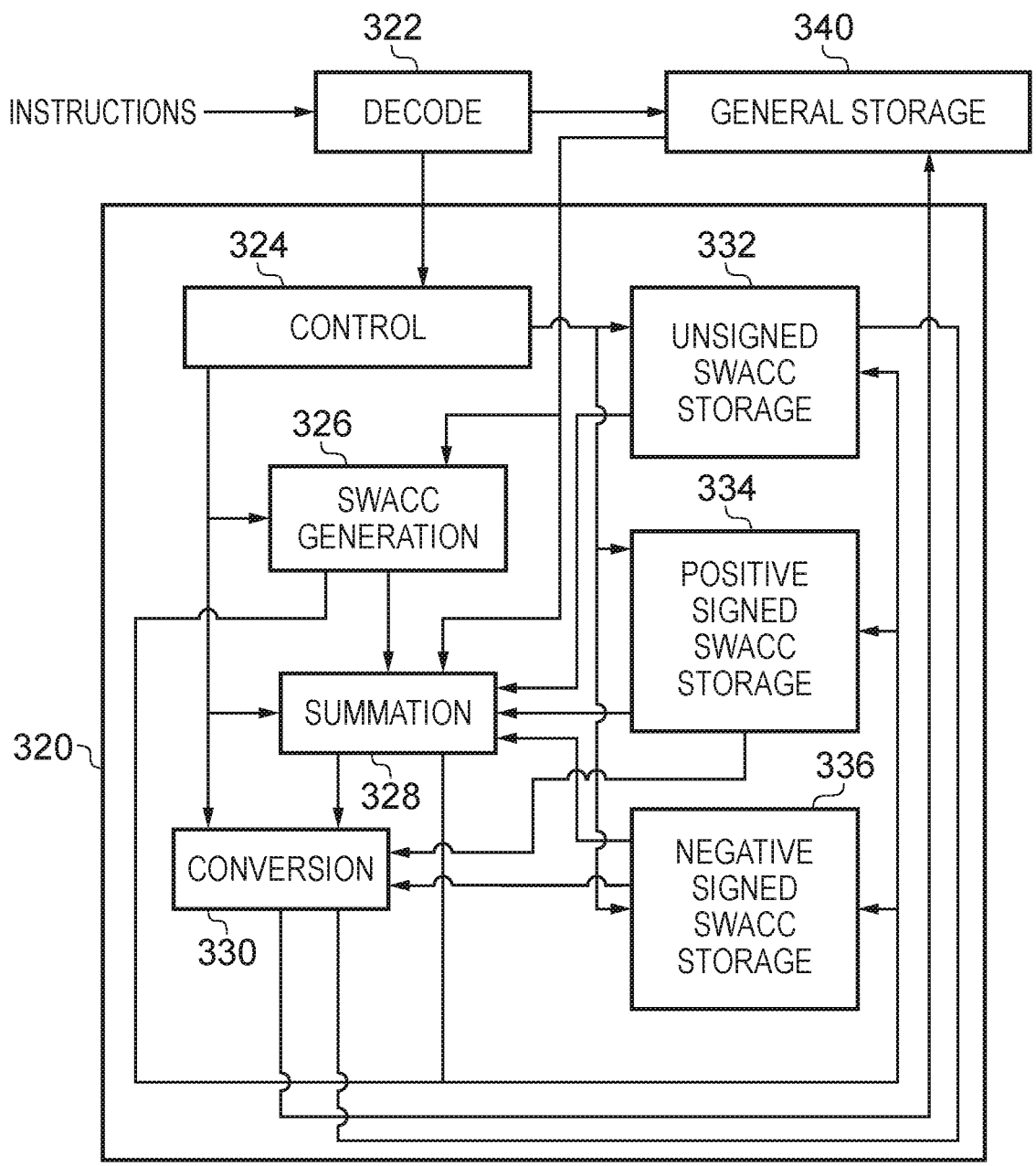
FIG. 11A schematically illustrates an apparatus for processing floating point values in the intermediate representation of the present techniques which includes both signed and unsigned representations in one embodiment.
FIG. 11B shows six example instructions which the apparatus of FIG. 10B is capable of executing.

FIG. 11A schematically illustrates an apparatus 320 in one embodiment, which is arranged to handle signed floating point values. This is enabled by the illustrated embodiment by the provision of separate storage respectively to accumulate positive SWAcc (PSWAcc) values and to accumulate negative SWAcc (NSWAcc) values. The apparatus 320 is configured in its operation by the reception of control signals from the decode unit 322, which decodes instructions fetched from memory. The control signals are received in the apparatus 320 by the control unit 324 which in turn controls the operation of the other components of the apparatus. SWAcc generation circuitry 326, summation circuitry 328 and conversion circuitry 330 are shown, which generally operate as was described for the corresponding components 204, 208 and 234 in FIG. 9A. The apparatus 320 also comprises unsigned SWAcc storage 332, positive signed SWAcc storage 334 and negative signed SWAcc storage 336. The control circuitry 324 identifies the unsigned or signed nature of an accumulation operand, and causes the circulation to be performed with respect to the appropriate storage. Referring to FIG. 5, this sign identification role is shown being performed by the sign identification circuitry 106. In the context of the present techniques this separation of signed SWAcc accumulation in dependence on the polarity ensures that the accumulator's_e value never decreases and window shifts only happen in one direction. It also further removes any dependence on the order of summation. A SWAcc value from one of the three storage components 332, 334, and 336 may be converted by conversion unit 330 into a floating point value which is then stored in the general storage 340, which in the illustration of FIG. 11A is an external memory device. The general storage device 340 may also provide an operand for accumulation in dependence on the nature of the instruction being executed. In order to generate a final result from the separate accumulation of the positive signed SWAcc and the negative signed SWAcc values, the negative signed SWAcc value is subtracted (in the summation circuitry 328) from the positive signed SWAcc value (since it will be understood that each is in fact an absolute value, and it is the storage location which defines its polarity). Alternatively, the positive and negative SWAccs could first be converted to floating point values and then subtracted.

FIG. 11B shows a set of example instructions provided by the present techniques, as may for example be executed by the apparatus of FIG. 9A, of FIG. 9B or of FIG. 11A as appropriate. These show:

- a generation instruction (i) providing a floating point value to be converted to SWAcc format, and the required destination;
- a summation instruction (ii) providing two SWAcc operands to be summed;
- a summation instruction (iii) providing a floating point value and a SWAcc operand to be summed (where the floating point value will first be converted to SWAcc format);
- a summation instruction (iv) providing two signed SWAcc operands to be summed;
- a summation instruction (v) providing a floating point value and a signed SWAcc operand to be summed (where the floating point value will first be converted to SWAcc format); and
- a summation instruction (vi) providing a signed SWAcc operand and an unsigned SWAcc operand to be summed, with an additional sign value indicating the sign of the unsigned SWAcc operand.

Note that for each of the instructions (ii) to (vi) a destination for the result may optionally be defined, and otherwise the operation is treated as an accumulation on the second of the two operands. The present techniques are not limited to the example instructions shown in FIG. 11B and various other example instructions to which the techniques can be applied are conceivable. To give just one such further example an instruction could be provided as "SWACCSUM (FP, FP, DESTINATION)", being a summation instruction providing two floating point values to be summed in SWAcc format (where each floating point value will first be converted to SWAcc format).

Figure 12:
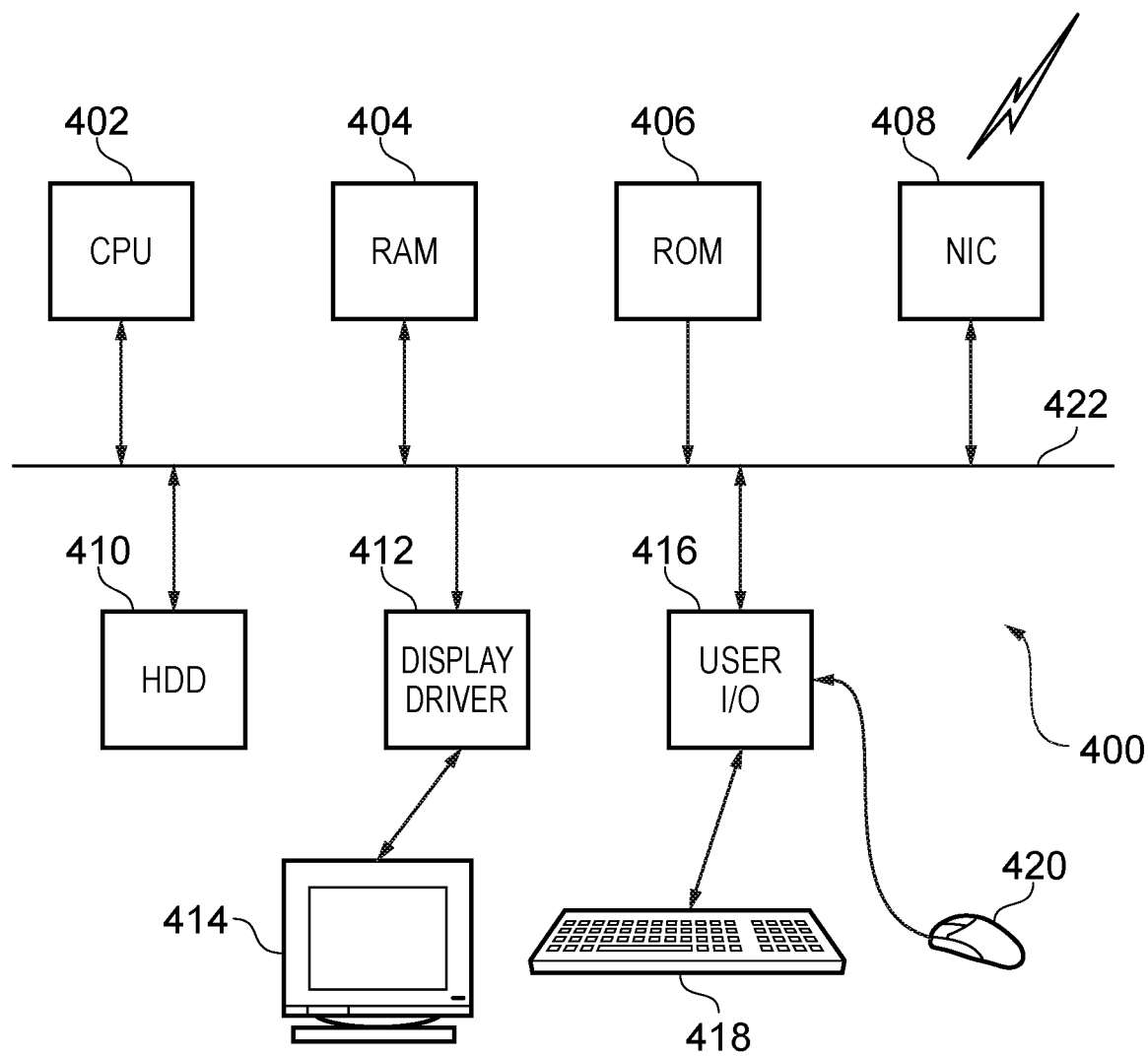
FIG. 12 schematically illustrates a general purpose computing device which is used to support the present techniques in some embodiments.

FIG. 12 schematically illustrates a general purpose computing device 400 of a type that may be used to implement the above described techniques. The general purpose computing device 400 includes a central processing unit 402, a random access memory 404 and a read only memory 406, connected together via bus 422. It also further comprises a network interface card 408, a hard disk drive 410, a display driver 412 and monitor 414 and a user input/output circuit 416 with a keyboard 418 and mouse 420 all connected via the common bus 422. In operation the central processing unit 402 will execute computer program instructions that may for example be stored in the random access memory 404 and/or the read only memory 406. In such a situation program instructions could be additionally retrieved from the hard disk drive 410 or dynamically downloaded via the network interface card 408. The results of the processing performed may be displayed to a user via a connected display driver 412 and monitor 414. User inputs for controlling the operation of the general purpose computing device 400 may be received via a connected user input output circuit 416 from the keyboard 418 or the mouse 420. It will be appreciated that the computer program could be written in a variety of different computer languages. The computer program may be stored locally on a recording medium or dynamically downloaded to the general purpose computing device 400. When operating under control of an appropriate computer program, the general purpose computing device 400 can perform the above described techniques relating to the processing and storage of SWAcc values and can be considered to form an apparatus for performing such techniques. The architecture of the general purpose computing device 400 could vary considerably and FIG. 12 is only one example.

In brief summary, the present techniques related to processing floating point values using an intermediate representation which has significand, exponent and shadow portions. A less significant portion of the exponent of the floating point value defines a range of positions within the significand section where the representation of the significand is to be held. The exponent section holds a representation of a more significant portion of the exponent indicating a selected window of multiple contiguous windows spanning a value range of a format of the floating point value. A first portion of the significand section corresponds to the selected window and a second portion corresponds to an overlap into a further window which is adjacent to and lower in the value range. The shadow section holds a copy of a more significant portion of the first portion corresponding in size to the second portion. The shadow section allows the selected window to be shifted, such that the summation of multiple values produces the same result independent of the order in which the values are summed.

At least one embodiment provides apparatus comprising: circuitry for processing an intermediate representation of a floating point value, wherein the circuitry comprises: significand processing circuitry for processing a significand section of the intermediate representation which holds a representation of a significand of the floating point value, wherein a less significant portion of an exponent of the floating point value defines a range of positions within the significand section where the representation of the significand is to be held; exponent processing circuitry for processing an exponent section of the intermediate representation which holds a representation of a more significant portion of the exponent of the floating point value which indicates a selected window of multiple contiguous windows spanning a value range of a format of the floating point value, wherein a first portion of the significand section corresponds to the selected window and wherein a second portion of the significand section corresponds to an overlap into a further window which is adjacent to and lower in the value range than the selected window; and shadow processing circuitry for processing values for populating the second portion of the significand section when the representation of the significand of the floating point value is moved to a higher window which is adjacent to and higher in the value range than the selected window.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. Apparatus comprising:
    circuitry for processing an intermediate representation of a floating point value, wherein the intermediate representation comprises:
        a significand section to hold a representation of a significand of the floating point value, wherein a less significant portion of an exponent of the floating point value defines a range of positions within the significand section where the representation of the significand is to be held;
        an exponent section to hold a representation of a more significant portion of the exponent of the floating point value which indicates a selected window of multiple contiguous windows spanning a value range of a format of the floating point value,
            wherein a first portion of the significand section corresponds to the selected window and wherein a second portion of the significand section corresponds to an overlap into a further window which is adjacent to and lower in the value range than the selected window; and
        a shadow section, separate from the significand section, to hold values for populating the second portion of the significand section when the representation of the significand of the floating point value is moved to a higher window which is adjacent to and higher in the value range than the selected window.

2. The apparatus as claimed in claim 1, further comprising:
    summation circuitry to perform a summation operation on two operands in the intermediate representation, wherein the summation operation comprises:
    comparing a first exponent value and a second exponent value respectively from the exponent sections of the two operands and, when the first exponent value and the second exponent value differ by one, performing a window shift operation on a smaller operand of the two operands to adjust the selected window of the smaller operand to match the selected window of a larger operand of the two operands; and
    summing the significand sections and the shadow sections respectively of the two operands to generate a sum value in the intermediate representation.

3. The apparatus as claimed in claim 2, further comprising storage circuitry to store the intermediate representation and wherein one of the two operands is stored in the storage circuitry and the other of the two operands is an immediate summand.

4. The apparatus as claimed in claim 2, further comprising storage circuitry to store the intermediate representation and wherein the summation operation is an accumulation operation with respect to the one of the two operands stored in the storage circuitry.

5. The apparatus as claimed in claim 2, wherein the summation circuitry, to perform the window shift operation, comprises:
    copying circuitry to copy the shadow section of the smaller operand to the second portion of the significand section of the smaller operand;
    clearing circuitry to clear the shadow section of the smaller operand and to clear the first portion of the significand section of the smaller operand; and
    increment circuitry to increment the exponent value of the smaller operand by one.

6. The apparatus as claimed in claim 2, wherein the summation circuitry has circuitry, responsive to the summing of the significand sections of the two operands resulting in a significand overflow, to perform the window shift operation on the sum value to adjust the selected window of the two operands to give a selected window of the sum value.

7. The apparatus as claimed in claim 6, wherein the copying circuitry has circuitry to copy a shadow overflow to a least significant portion of the first portion of the significand section of the smaller operand.

8. The apparatus as claimed in claim 6, further comprising significand overflow storage and circuitry, responsive to the summing of the significand sections of the two operands resulting in the significand overflow, to store the significand overflow in the significand overflow storage.

9. The apparatus as claimed in claim 2, wherein the summation circuitry is responsive to the first exponent value and the second exponent value differing by more than one, to use the larger operand of the two operands as the sum value in the intermediate representation and to terminate the summation operation.

10. The apparatus as claimed in claim 2, wherein the intermediate representation comprises a special number section to store a special number indicator, wherein the special number indicator has a special value when the floating point value is an infinity or a not-a-number, wherein the summation circuitry comprises special number handling circuitry responsive to the special number indicator having the special value set, to set a special number indicator in the sum value to the special value and to terminate the summation operation.

11. The apparatus as claimed in claim 1, wherein the intermediate representation comprises a special number section to store a special number indicator, wherein the special number indicator has a special value when the floating point value is an infinity or a not-a-number.

12. The apparatus as claimed in claim 11, wherein the summation circuitry, to perform the window shift operation, comprises:
    copying circuitry to copy the shadow section of the smaller operand to the second portion of the significand section of the smaller operand;
    clearing circuitry to clear the shadow section of the smaller operand and to clear the first portion of the significand section of the smaller operand; and
    increment circuitry to increment the exponent value of the smaller operand by one,
    wherein the increment circuitry is responsive to performing the window shift operation on the sum value resulting in an exponent overflow of the exponent section of the sum value to set the special number indicator to the special value in the sum value.

13. The apparatus as claimed in claim 11, further comprising syndrome circuitry responsive to the special number indicator having the special value set to cause syndrome information to be stored in at least one of the significand section, the shadow section and the special number section, wherein the syndrome information is indicative of a cause of the infinity or the not-a-number.

14. The apparatus as claimed in claim 13, wherein the syndrome information comprises at least a portion of a program counter of an instruction which caused the infinity or the not-a-number.

15. The apparatus as claimed in claim 13, wherein the syndrome information comprises at least a portion of a program counter indicative of a group of instructions, wherein an instruction of the group caused the infinity or the not-a-number.

16. The apparatus as claimed in claim 1, further comprising lane-based vector processing circuitry and wherein a length of the significand and exponent sections corresponds to a first multiple of a lane size of the lane-based vector processing circuitry and a length of the shadow section corresponds to a second multiple of the lane size of the lane-based vector processing circuitry.

17. The apparatus as claimed in claim 16, wherein, when a length of the second portion of the significand section and the length of the exponent section is less than the lane size, the significand section further comprises a significand extension portion wherein the length of the second portion, the length of the exponent section and a length of the significand extension portion sum to the length of the lane size.

18. The apparatus as claimed in claim 16, further comprising summation circuitry to perform a summation operation on two operands in the intermediate representation, wherein the summation operation comprises:
    comparing a first exponent value and a second exponent value respectively from the exponent sections of the two operands and, when the first exponent value and the second exponent value differ by one, performing a window shift operation on a smaller operand of the two operands to adjust the selected window of the smaller operand to match the selected window of a larger operand of the two operands; and
    summing the significand sections and the shadow sections respectively of the two operands to generate a sum value in the intermediate representation, wherein the summation circuitry comprises circuitry to zero one of the first exponent value and the second exponent value when the exponent section is within a lane of the lane-based vector processing circuitry.

19. A method executed on a computing device of storing an intermediate representation of a floating point value, the method comprising:
    storing a representation of a significand of the floating point value in a significand section of the intermediate representation, wherein a less significant portion of an exponent of the floating point value defines a range of positions within the significand section where the representation of the significand is to be stored;
    storing a representation of a more significant portion of the exponent of the floating point value in an exponent section of the intermediate representation, which indicates a selected window of multiple contiguous windows spanning a value range of a format of the floating point value,
    wherein a first portion of the significand section corresponds to the selected window and wherein a second portion of the significand section corresponds to an overlap into a further window which is adjacent to and lower in the value range than the selected window; and
    storing, separate to the representation of the significand, values for populating the second portion of the significand section when the representation of the significand of the floating point value is moved to a higher window which is adjacent to and higher in the value range than the selected window.

20. A computer program product on which is stored in a non-transient fashion a computer program which when executed on a computing device causes the computing device to carry out the method of claim 19.

* * * * *